United States Patent
Bak et al.

[11] Patent Number: 6,167,424
[45] Date of Patent: Dec. 26, 2000

[54] METHOD AND APPARATUS FOR CONCURRENT THREAD SYNCHRONIZATION

[75] Inventors: Lars Bak; Timothy G. Lindholm, both of Palo Alto, Calif.

[73] Assignee: Sun Microsystems, Inc., Palo Alto, Calif.

[21] Appl. No.: 08/957,955

[22] Filed: Oct. 27, 1997

Related U.S. Application Data

[63] Continuation-in-part of application No. 08/743,484, Nov. 4, 1996.
[60] Provisional application No. 60/057,050, Aug. 27, 1997.

[51] Int. Cl.[7] ............................................ G06F 9/00
[52] U.S. Cl. ........................... 709/100; 709/104; 707/103
[58] Field of Search ................... 707/8, 103, 1; 709/100, 104, 315, 106, 305; 712/28; 711/125

[56] References Cited

U.S. PATENT DOCUMENTS

| | | | |
|---|---|---|---|
| 4,525,780 | 6/1985 | Bratt et al. | 711/163 |
| 5,020,080 | 5/1991 | Tanguy et al. | 375/324 |
| 5,060,144 | 10/1991 | Sipple et al. | 710/200 |
| 5,136,712 | 8/1992 | Perazzoli, Jr. et al. | 709/104 |
| 5,379,432 | 1/1995 | Orton et al. | 709/315 |
| 5,414,839 | 5/1995 | Joshi | 707/8 |
| 5,442,758 | 8/1995 | Slingwine et al. | 707/8 |
| 5,598,562 | 1/1997 | Cutler et al. | 709/104 |
| 5,630,136 | 5/1997 | Davidson et al. | 709/106 |
| 5,684,974 | 11/1997 | Onodera | 711/202 |
| 5,701,470 | 12/1997 | Joy et al. | 707/103 |
| 5,727,178 | 3/1998 | Pletcher et al. | 711/202 |
| 5,732,404 | 3/1998 | Johnson et al. | 711/2 |
| 5,797,004 | 2/1999 | Lindholm et al. | 709/100 |
| 5,822,588 | 10/1998 | Sterling et al. | 717/4 |
| 5,875,461 | 2/1999 | Lindholm | 711/118 |
| 5,893,912 | 4/1999 | Freund et al. | 707/103 |
| 5,924,098 | 7/1999 | Klunge | 707/100 |
| 5,951,672 | 9/1999 | Kwok et al. | 712/28 |
| 6,021,469 | 2/2000 | Tremblay et al. | 711/125 |

*Primary Examiner*—John Breene
*Assistant Examiner*—Greta L. Robinson
*Attorney, Agent, or Firm*—Beyer Weaver & Thomas, LLP

[57] ABSTRACT

Methods and apparatus for locking and unlocking objects using synchronized threads are disclosed. According to one aspect of the present invention, a computer-implemented method for using a first thread to obtain a header value of an object includes replacing contents of a header of the object with a sentinel which identifies an execution stack associated with the first thread. Once the object contents are replaced with the sentinel, a determination is made regarding whether the object contents include a header value of the object, and when it is determined that the object contents do not include the header value of the object, a determination is made as to when the object is in the process of being studied by a second thread. In one embodiment, when it is determined that the object is not in the process of being studied by the second thread, the method involves adding the first thread to a list associated with the stack.

26 Claims, 15 Drawing Sheets

METHOD AND APPARATUS FOR CONCURRENT THREAD SYNCHRONIZATION

CROSS REFERENCE TO RELATED APPLICATIONS

The present invention is a continuation-in-part of U.S. patent application Ser. No. 08/743,484, filed Nov. 4, 1996, and claims priority of co-pending provisional U.S. patent application Ser. No. 60/057,050, filed Aug. 27, 1997, which are incorporated herein by reference in their entirety.

BACKGROUND OF THE INVENTION

1. Field of Invention

The invention relates generally to methods and apparatus for locking and unlocking objects in an object-based system. More particularly, the invention relates to methods and apparatus for enabling multiple concurrent threads to operate synchronously, and efficiently, in an object-based system.

2. Description of Relevant Art

An object generally includes a set of operations and a state that remembers the effect of the operations. Since an object has some memory capability, an object differs from a function, which has substantially no memory capability. For example, a value returned by an operation associated with an object is dependent upon the state of the object as well as the arguments to the operation. As such, each invocation of an object may have a different result. In contrast, a value returned by a function is typically dependent only on the arguments to the function. Accordingly, for a given set of arguments, each invocation of a function will have the same result.

Within an object-based environment, threads are often used to satisfy requests for services. A thread may be thought of as a "sketch pad" of storage resources, and is essentially a single sequential flow of control within a computer program. In general, a thread, or a "thread of control," is a sequence of central processing unit (CPU) instructions or programming language statements that may be independently executed. Each thread has its own execution stack on which method activations reside. As will be appreciated by those skilled in the art, when a method is activated with respect to a thread, an activation is "pushed" on the execution stack of the thread. When the method returns, or is deactivated, the activation is "popped" from the execution stack. Since an activation of one method may activate another method, an execution stack operates in a first-in-last-out manner.

Threads may generally be either "cooperative" or "concurrent." Threads are considered to be cooperative when a single thread maintains complete control, e.g., control of a computational resource such as a processor or a process, until the thread voluntarily relinquishes control. Concurrent threads, on the other hand, are arranged such that although a thread may also voluntarily relinquish control, other threads may essentially cause the thread to involuntarily relinquish control.

In a concurrent threading model, multiple threads are allowed to execute independently of one another. Rather than being cooperatively scheduled like cooperative threads, concurrent threads are preemptively scheduled. That is, a computation by a given concurrent thread may be preempted at any point in time by an outside entity such as another concurrent thread, e.g., a scheduler, or the operating system. Thread preemption may occur because of meaningful events in the execution of a program. By way of example, a meaningful event may be when a thread's priority is programmatically raised to be higher than that of a currently running thread. Alternatively, thread preemption may occur because of artificially induced events such as the elapsing of a particular interval of time.

During the execution of an object-based program, a thread may attempt to execute operations which involve multiple objects. On the other hand, multiple threads may attempt to execute operations which involve a single object. Frequently, only one thread is allowed to invoke one of some number of operations, i.e., synchronized operations, that involve a particular object at any given time. That is, only one thread may be allowed to execute a synchronized operation on a particular object at one time. A synchronized operation, e.g., a synchronized method, is block-structured in that it requires that the thread invoking the method to first synchronize with the object that the method is invoked on, and desynchronize with that object when the method returns. Synchronizing a thread with an object generally entails controlling access to the object using a synchronization construct before invoking the method.

In addition to the synchronized operations defined on a given object, there may be some number of non-synchronized operations defined on that object. Non-synchronized operations are not prevented from being simultaneously executed on a given object by more than one thread. Several non-synchronized operations may be executed at once on a given object, and one or more non-synchronized operations may be executed at the same time as a synchronized operation.

Since a concurrent thread is not able to predict when it will be forced to relinquish control, synchronization constructs such as locks, mutexes, semaphores, and monitors may be used to control access to shared resources during periods in which allowing a thread to operate on shared resources would be inappropriate. By way of example, in order to prevent more than one thread from operating on an object at any particular time, objects are often provided with locks. The locks are arranged such that only the thread that has possession of the lock for an object is permitted to execute a method on that object. With respect to FIG. 1, a process of acquiring an object lock will be described. The process of acquiring an object lock begins at step 104 where a thread obtains the object on which the thread wishes to operate. In general, the object on which the thread intends to operate has an associated object lock. Then, in step 106, a determination is made regarding whether the object is locked. That is, a determination is made regarding whether the object lock associated with the object is held by another thread, e.g., a thread that is currently operating on the object.

If the determination in step 106 is that the object is not locked, then the thread acquires the object lock in step 108. Alternatively, if the object is locked, then the thread waits for the object to be unlocked in step 110. Once the object is unlocked, process flow moves from step 110 to step 108 where the object is locked by the thread.

As previously mentioned, a thread is permitted to execute a synchronized operation on an object if it successfully acquires the lock on the object. While one thread holds the lock on an object, other threads may be allowed to attempt to execute additional synchronization operations on the object, and may execute non-synchronized operations on the object. Thread synchronization is a process by which threads may interact to check the status of objects, whether the objects are locked or unlocked, while allowing only the thread which holds an object lock to execute synchronized operations on the locked object. Thread synchronization also enables threads to obtain and remove object locks.

When threads are synchronized, in order to make certain that only the thread that possesses an object lock is allowed to operate on a locked object, synchronization constructs are generally provided. FIG. 2 is a diagrammatic representation of the interface between a thread, an object, and a synchronization construct in an object-based system. A thread 202 attempts to execute a synchronized operation on an object 204. In order for thread 202 to execute the synchronized operation on object 204, thread 202 must first obtain the object lock for object 204.

When thread 202 attempts to execute a synchronized operation on object 204, a synchronization construct 206 which is associated with object 204 is obtained. In general, object 204 is dynamically associated with a synchronization construct, as for example synchronization construct 206a, which is arranged to provide synchronized access to object 204. If synchronization construct 206a permits re-entrant locking of object 204, it may include a counter 208 which may be incremented to keep track of the number of times object 204 has been locked by thread 202. Synchronization construct 206a further includes an object pointer 210 that identifies object 204 or, more generally, the object with which monitor 206a is associated, Synchronization construct 206a also includes an identifier for thread 202, the thread that currently has locked synchronization construct 206a.

A synchronization construct cache is generally a set of data structures and locks that implement a dynamic association between a synchronization construct and an object. For example, object 204 is mapped to synchronization construct 206a through a synchronization construct cache. Since synchronization constructs 206 may be of a size comparable to the size of objects, e.g., synchronization constructs 206a, 206b, 206c may require more memory space than some objects, synchronization constructs 206 are often dynamically associated with objects. Dynamically associating synchronization construct 206a with object 204 prevents object 204 from being associated with a relatively large amount of memory except when necessary, e.g., when object 204 is locked and synchronization construct 206a is in use.

Since synchronization construct 206a is not inherently associated with object 204, when thread 202 attempts to execute a synchronized operation on object 204, a search must be made to locate synchronization construct 206a. Specifically, a cache 212 of synchronization constructs 206 is searched to locate synchronization construct 206a. In general, only one synchronization construct 206 is associated with any given object 204. If a synchronization construct 206 that is associated with object 204 is not found, then a monitor 206 may be allocated using any suitable method.

Synchronization construct caches are described in more detail in U.S. patent application Ser. No. 08/569,805, now U.S. Pat. No. 5,797,004 filed Dec. 8, 1995, and U.S. patent application Ser. No. 08/832,090, now U.S. Pat. No. 5,875,461 filed Apr. 3, 1997, which are herein incorporated by reference in their entirety.

The use of monitors as synchronization constructs to track the status of objects is often relatively inefficient in that a software cache or a hash table of synchronization constructs must typically be searched in order to locate the proper monitor for use with a given object. Such searches may prove to be time-consuming, and generally utilize relatively large amounts of computer system resources. The cache of synchronization constructs, in itself, typically occupies a significant amount of computer memory. In addition, the memory management associated with allocating a monitor for an object when a suitable monitor does not already exist may be costly. Finally, as synchronization construct caches may be shared among multiple threads, they themselves may have to be locked prior to access or update, which both imposes additional costs in execution time and also introduces a source of locking contention that occurs when more than one thread wants to access the synchronization construct cache at one time.

If synchronization constructs are to support re-entrant locking, they may also require explicit counters which are used to track the number of times a given thread relocks an object that it has already locked. The implementation and maintenance of explicit counters may be relatively expensive in terms of the use of computer system resources. Further, since the synchronization construct explicitly keeps track of the thread that has locked it, the synchronization construct must be continually updated. Continually updating the synchronization construct is typically both time-consuming and expensive in terms of the consumption of computer system resources.

Although the use of synchronization constructs is generally effective in preventing concurrent execution of synchronized operations by several threads, the use of synchronization constructs is often inefficient and expensive in terms of the consumption of system resources, as previously described. Further, the space overhead associated with locking and unlocking synchronized objects is often high, while the execution speed associated with locking and unlocking may be low. Therefore, what is desired is an efficient method and apparatus for locking and unlocking objects. Specifically, what is desired is an efficient method and apparatus for keeping track of the status of an object in an object-based system that utilizes synchronized threads.

SUMMARY OF THE INVENTION

Methods and apparatus for locking and unlocking objects by threads are disclosed. According to one aspect of the present invention, a computer-implemented method for using a first thread to obtain a header value of an object includes replacing the contents of a header field of the object with a sentinel that identifies an execution stack associated with the first thread. Once the object header field contents are replaced with the sentinel, a determination is made regarding whether the object header field contents include a header value of the object, and when it is determined that the object header field contents do not include the header value of the object, a determination is made as to when the object is in the process of being studied by a second thread. In one embodiment, when it is determined that the object is not in the process of being studied by a second thread, the method involves adding the first thread to a list associated with the stack associated with the second thread. The list is arranged to indicate that the first thread is awaiting access to the object.

In another embodiment, when it is determined that the object is in the process of being studied by a second thread, the object header field contents are resolved to identify the second thread, and it is determined whether an execution priority associated with the second thread is less than an execution priority associated with the first thread. In such an embodiment, when it is determined that the second thread execution priority is less than the first thread execution priority, the method further includes boosting the second thread execution priority to match the first thread execution priority.

According to still another embodiment of the present invention, a computer-implemented method for returning a header value of an object to the header field of the object includes exchanging contents of a header field of the object for a sentinel that is arranged to identify an execution stack associated with a thread which possesses the header value of the object. The contents of the object header field are used to determine if a second thread is currently studying the object. If it is determined that the object is not being studied by the second thread, the sentinel is replaced with the header value to thereby return the header value to the object.

In one embodiment, when it is determined that the object is being studied by the second thread, the contents of the object header field are resolved to identify the second thread. Then, it is determined whether an execution priority of the second thread is less than the execution priority of the first thread. In such an embodiment, when it is determined that the second thread execution priority is less than the first thread execution priority, the method further includes boosting the second thread execution priority to the first thread execution priority to facilitate the processing of the object.

According to yet another aspect of the present invention, a computer system includes a memory and a plurality of threads, each of which has an associated stack. The computer system also includes a processor coupled to the memory, and an object that includes an object header field that contains a header value which includes information relating to the object. A first thread selected from the plurality of threads is arranged to obtain the header value and to place a first reference indicator in the object header field to identify the stack associated with the first thread. In one embodiment, a second thread selected from the plurality of threads is arranged to obtain the first reference indicator from the object header field. In such an embodiment, the second thread is also arranged to place a second reference indicator in the object header field which identifies a stack associated with the second thread.

These and other advantages of the present invention will become apparent upon reading the following detailed descriptions and studying the various figures of the drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE EMBODIMENTS

In a multi-threaded, object-based system, to make it possible to prevent more than one thread from operating on an object at any particular time, objects are typically provided with synchronization constructs. A synchronization construct is generally arranged such that only the thread which has locked a synchronization construct associated with an object is permitted to execute a synchronized operation on that object. Each object may be dynamically associated with a synchronization construct. A cache of synchronization constructs is maintained separately from their associated objects, and must generally be searched in order for an object to be mapped to its associated synchronization construct. Searching for an appropriate synchronization construct, and constantly updating the synchronization construct to reflect the status of the object, is often time-consuming and expensive, in terms of the use of computer system resources.

In the present invention, instead of recording the locking status of an object explicitly through the use of synchronization constructs, the locking status of an object is recorded implicitly, using only the object itself and the stack of the thread locking the object. The header field of an object, when the object is unlocked, contains a header value which includes information relating to the object. When a thread locks the object, the thread places the header value in the execution stack associated with the thread, and places a reference value in the object header field which identifies the thread stack. A locking status indicator in the object header field may then be set to a state which indicates that the object is locked. Then, when another thread attempts to lock the object, that thread may use the locking status indicator to determine that status of the object and, further, use the reference value to identify the thread which currently holds the lock associated with the object.

By implicitly indicating the locking status of an object in the object header field of the object, the use of explicit synchronization constructs, which are expensive, may be eliminated. Eliminating explicit synchronization constructs serves to reduce the computational overhead associated with tracking the locking status of objects. By way of example, the memory management associated with locking synchronization constructs and the computations involved with looking up the synchronization construct associated with an object may essentially be eliminated. As such, implicitly indicating the locking status of an object provides an inexpensive and efficient method for tracking the locking status of the object. It should be appreciated that the present invention may be used to generally eliminate the use of a wide variety of synchronization constructs, e.g., mutexes and semaphores.

Figure 1:
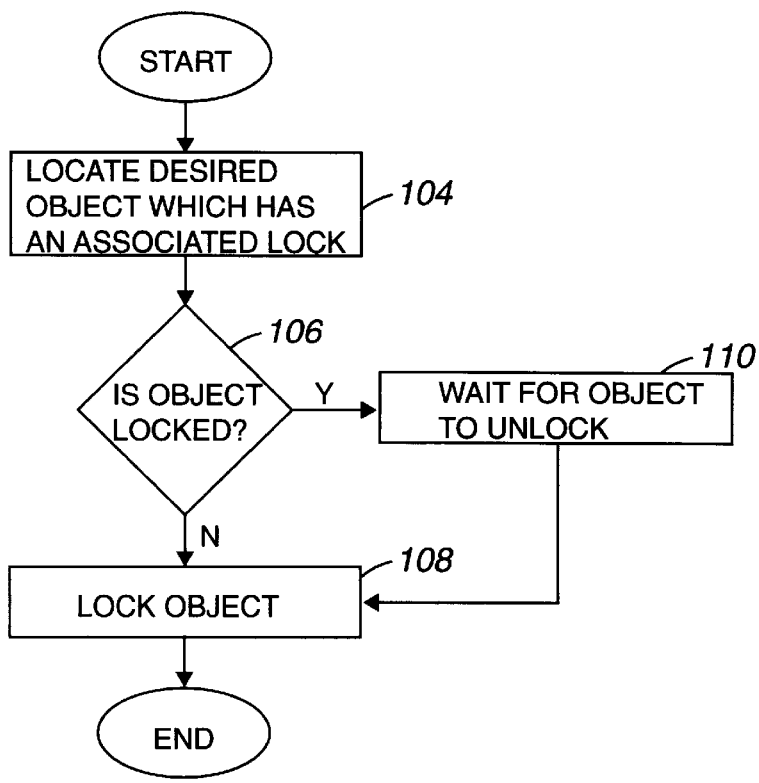
FIG. 1 is a process flow diagram which illustrates the steps associated with locking an object.
Figure 2:
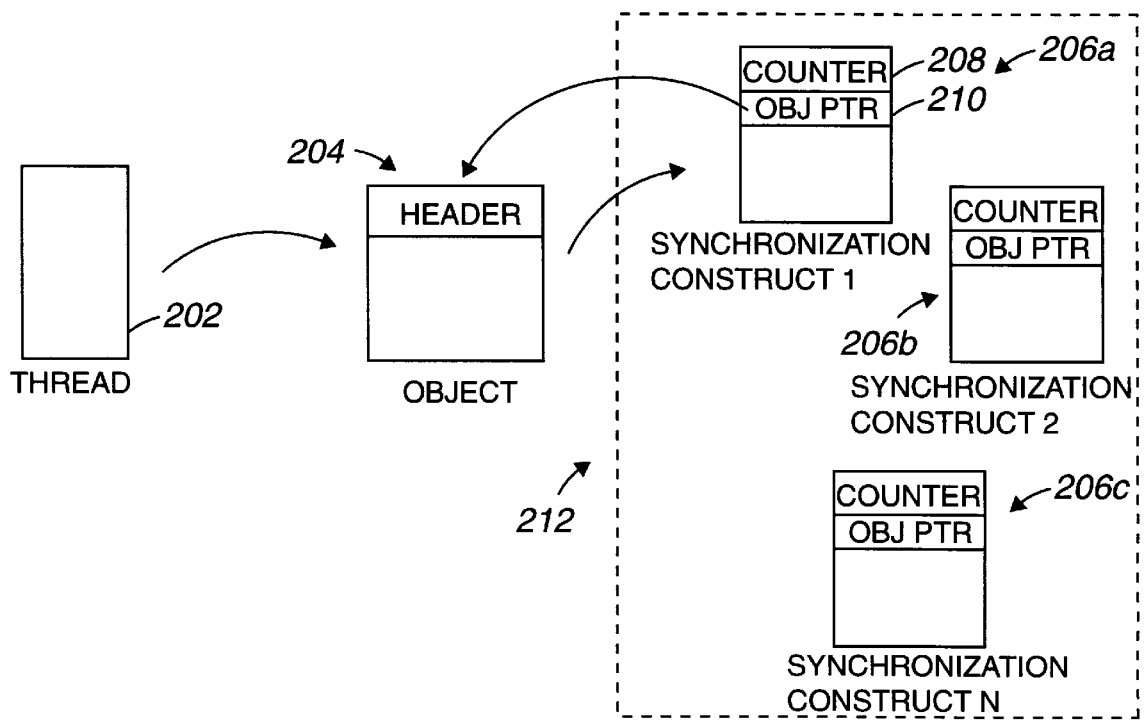
FIG. 2 is a diagrammatic representation of the associations between a thread, a called object, and a set of synchronization constructs.
Figure 3A:
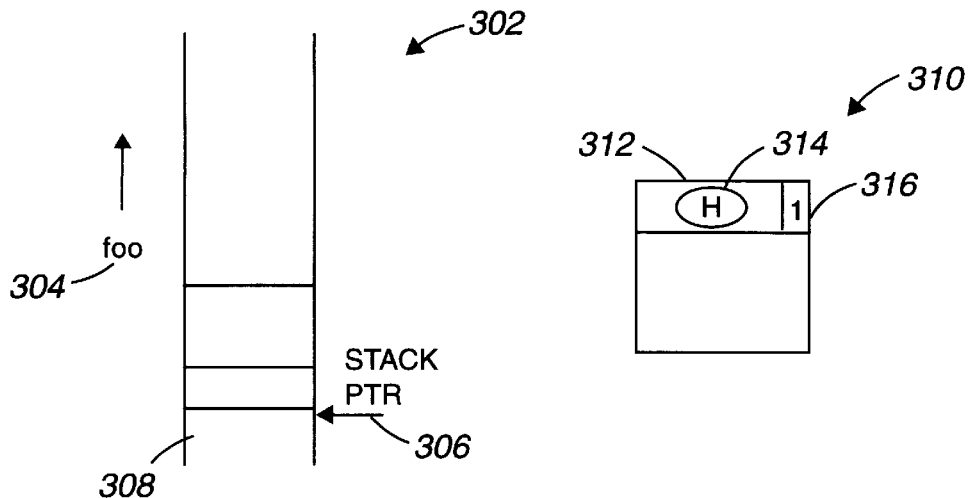
FIG. 3a is a diagrammatic representation of a cooperative thread stack and an object in accordance with an embodiment of the present invention.

If the locking status of an object is implicitly specified, whenever a thread attempts to lock the object, the thread generally studies the locking status indicator associated with the object. The thread may also study contents of the header field of the object to determine the identity of another thread which has either locked the object or is in the process of studying the object. Referring next to FIG. 3*a*, a thread stack and an object will be described in accordance with an embodiment of the present invention. An execution stack 302, which is local to a thread, is used when a synchronized operation, in this case an invocation of a synchronized method "foo" 304, is invoked. Synchronized method foo 304 is executed on stack 302, as will be appreciated by those skilled in the art. A stack pointer 306 points to a current memory address or location, e.g., location 308, within stack 302.

An object 310, upon which method foo 304 may be invoked, includes a header field 312. When object 310 is unlocked, hence free to be locked by a thread, the contents of object header field 312 include a header value 314 and a locking status indicator 316. Header value 314 generally includes information which is relevant to object 310. By way of example, header value 314 may include identity hash values and garbage collection, i.e., memory management, information. Locking status indicator 316, in the described embodiment, is a tag bit which indicates whether object 310 is unlocked. As shown, when locking status indicator 316 has a value of "1," object 310 is unlocked.

Figure 3B:
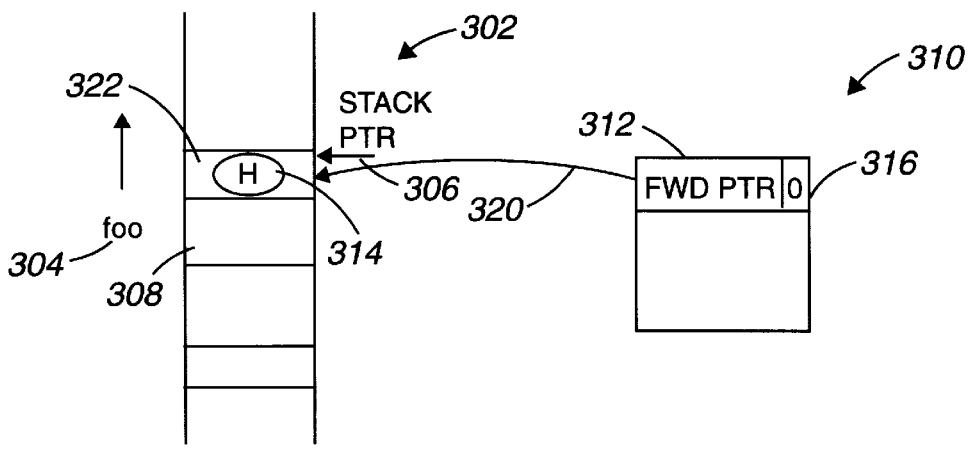
FIG. 3b is a diagrammatic representation of the cooperative thread stack and the object of FIG. 3a after the header value of the object has been placed on the stack in accordance with an embodiment of the present invention.

Prior to the invocation of method foo 304, header value 314 is stored onto stack 302, as shown in FIG. 3*b*. Then, once header value 314 is stored onto stack 302, the locking status indicator 316 within object 310 is set to indicate that object 310 is locked, i.e., that object header field 312 no longer contains header value 314. In one embodiment, when object 310 is locked, locking status indicator 316 has a value of "0," whereas when the object is unlocked, locking status indicator 316 has a value of "1" as illustrated in FIG. 3*a*.

A forwarding pointer 320, which refers to a stack header location 322 on stack 302, is stored in object header field 312 when header value 314 is stored on stack 302. Stack header location 322 is the location within stack 302 where header value 314 is stored. As shown, stack pointer 306 also points to stack header location 322 while header value 314 is being stored on stack 306, since stack header location 322 is the current memory location on stack 306 which is in use.

Figure 3C:
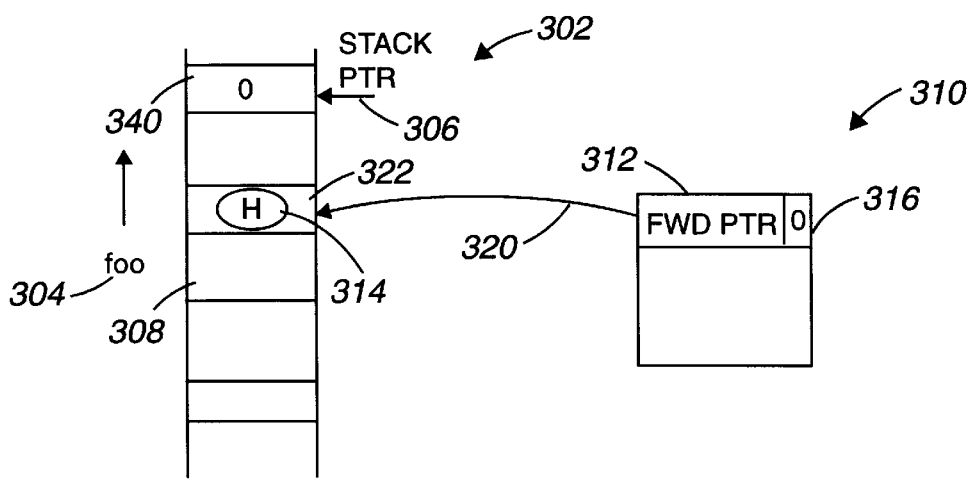
FIG. 3c is a diagrammatic representation of the cooperative thread stack and the object of FIG. 3b after the object has been re-entered by the thread associated with the thread stack in accordance with an embodiment of the present invention.

In general, method foo 304 may invoke other methods. In particular, method foo 304 may transitively invoke another synchronized method bar (not shown) on object 310. When method foo 304 calls method bar on object 310, object 310 will typically need to be used by both the original invocation of method foo 304 as well as by the invocation of method bar. However, since header value 314 is already stored on stack 302, header value 314 may not be re-obtained for storage on stack 302. Instead, an indicator value 340, e.g., "0," may be stored on stack 302, as shown in FIG. 3*c*. Indicator value 340 is arranged to indicate that the thread having stack 302 has invoked another synchronized method on object 310, since header value 314 is present on stack 302.

As previously mentioned, in one embodiment, threads may either be cooperative or concurrent. Cooperative threads differ from concurrent threads in that once a cooperative thread has control, the cooperative.thread maintains control until the cooperative thread voluntarily relinquishes control. On the other hand, when a concurrent thread has control, the concurrent thread may lose control at any time.

In general, in order for a thread to execute a synchronized operation on an object, the thread obtains the lock associated with the object. In one embodiment, obtaining an object lock involves obtaining the value of the object header field. When a cooperative thread obtains an object lock, the cooperative thread holds the object lock until the cooperative thread has completed its use of the object, without interference from other threads. The steps associated with a cooperative thread obtaining an object lock will be described below with reference to FIG. 4*a*, whereas the steps associated with a concurrent thread obtaining an object lock will be described below with respect to FIGS. 6*a* and 6*b*.

Figure 4A:
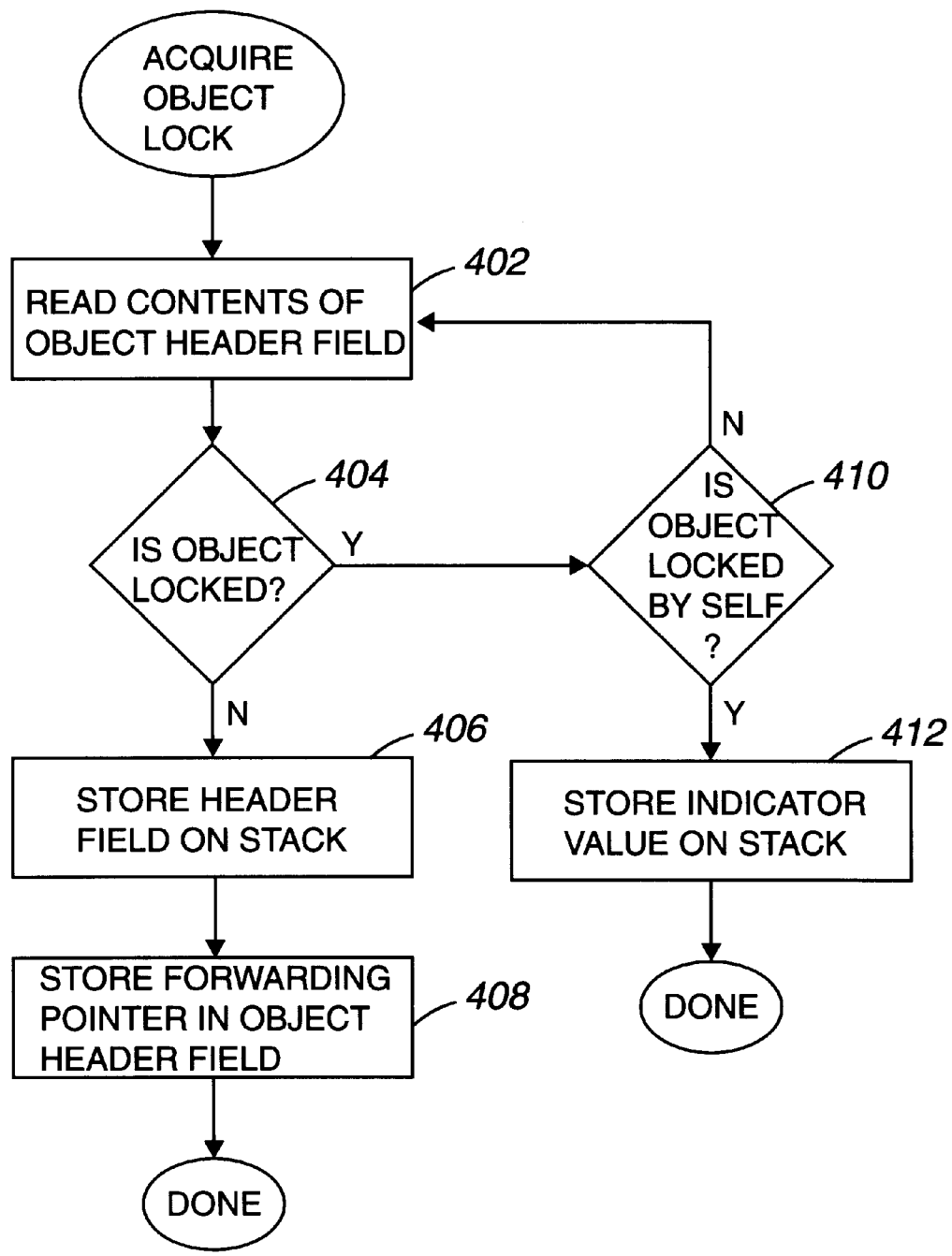
FIG. 4a is a process flow diagram which illustrates the steps associated with acquiring an object lock using a cooperative thread in accordance with an embodiment of the present invention.

With reference to FIG. 4a, a process of acquiring an object lock by a cooperative thread will be described in accordance with an embodiment of the present invention. In the described embodiment, the process of acquiring an object lock involves obtaining the value of the object header field, as mentioned above. The process begins at step 402 in which the thread reads the contents of the header field of the object. Then, in step 404, using the object header field contents, a determination is made regarding whether the object is locked. In general, when an object is locked, the object header field contents include a forwarding pointer, or a reference, to a thread which has locked the object. Alternatively, when an object is unlocked, the object header field contents include the header value of the object.

If it is determined in step 404 that the object is not locked, then in step 406, the object header field contents are stored in the stack associated with the thread. In other words, the header value read from the object header field is stored on the stack. After the header value is stored on the stack, process flow moves to step 408 where a forwarding pointer is stored in the object header field. It should be appreciated that the forwarding pointer includes a reference to the location in the stack where the header value is stored, i.e., the forwarding pointer points to the location on the stack where the header value is stored. Once the forwarding pointer is in place, the process of acquiring an object lock is completed.

Returning to step 404, if it is determined that the object is locked, then process flow moves to step 410 where the thread determines whether the thread already holds the lock on the object, i.e., whether the current synchronized operation is a re-entrant operation. If it is determined that the thread currently holds the lock on the object, then the implication is that the object is being accessed by a subsequent synchronized operation on the object by the thread. Therefore, in the described embodiment, an indicator value is stored on the stack associated with the thread in step 412 to indicate that the thread already holds the object lock, and that the object is being used by a re-entrant synchronized operation. In general, the indicator value may be any suitable value which indicates that the header value of the object is stored in another location on the thread stack. By way of example, the indicator value may the value zero. After the indicator value is stored in the stack, an object lock is considered to be acquired.

When a synchronized operation returns, the thread, e.g., the cooperative thread, which holds an object lock no longer needs the object associated with the object lock. Hence, the cooperative thread unlocks the object. Upon return or deactivation of the synchronized operation, when the header value of the object is encountered on the stack, the header value is stored over the forwarding pointer in the object header field. By returning the header value to the object header field, the object is unlocked, i.e., made free to be locked. Alternatively, when an indicator value reflecting a re-entrant lock acquisition is encountered on the thread stack when an attempt is made to unlock a locked object, the stack is "popped," as will be appreciated by those skilled in the art. Because the header value of the object remains on the thread stack in this latter case, the thread continues to hold the lock on the object until an unlocking operation is performed that returns the header value to the object header field.

In a cooperative threading model, a thread is allowed to maintain control until the thread voluntarily gives control to some other cooperative thread. Thus, once a cooperative thread has begun the operation of acquiring a lock on an object, this first cooperative thread may ensure that no second cooperative thread will gain control and be permitted to run until the first cooperative thread has completed acquiring the lock. Alternatively, if the lock on the object is already owned by some other cooperative thread, the first cooperative thread may ensure that no second cooperative thread will gain control and be permitted to run until the first cooperative thread has arranged to wait for the lock on the object to become free.

In a concurrent threading model, on the other hand, a thread may involuntarily have control taken from it at any time, including once it has begun the operation of acquiring a lock on an object and before it has completed acquiring that lock. Thus, mechanisms are supplied that prevent the computation from "stalling," or ceasing to make progress. This could occur because a first concurrent thread which has begun to acquire the lock on an object is preempted prior to fully acquiring the lock, this uncompleted acquisition preventing other concurrent threads from themselves acquiring the lock on the object. A method which guarantees progress by a first concurrent thread toward completing acquisition of the lock of an object, even in the event of preemption of that first concurrent thread, will be described below with respect to FIGS. 6a and 6b.

Figure 4B:
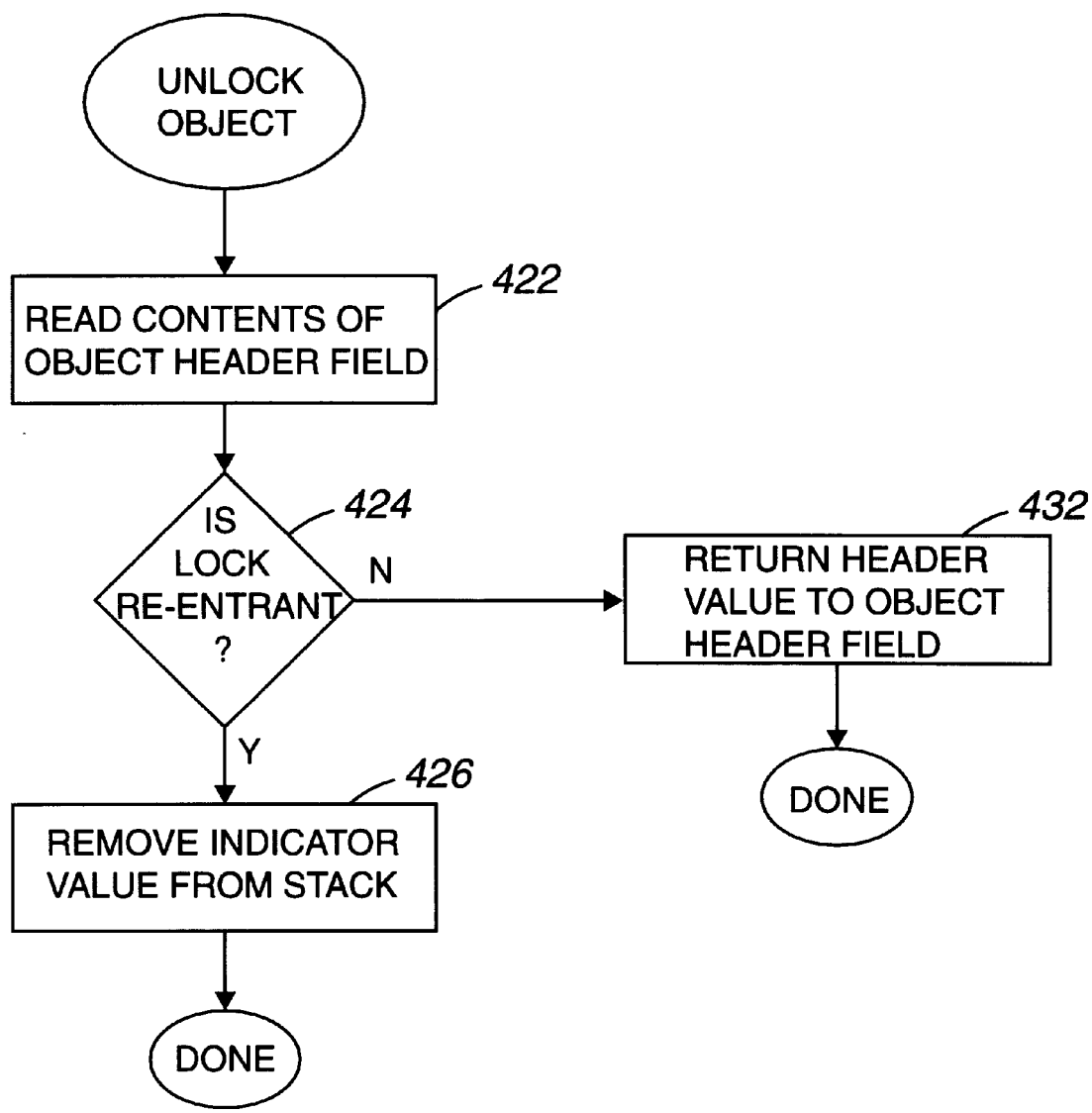
FIG. 4b is a process flow diagram which illustrates the steps associated with unlocking an object locked using a cooperative thread in accordance with an embodiment of the present invention.

FIG. 4b is a process flow diagram which illustrates the steps associated with a cooperative thread unlocking an object which it has previously locked in accordance with an embodiment of the present invention. The process begins at step 422 where the object header field contents are read from the object which is to be unlocked. It should be appreciated that the same cooperative thread which is attempting to unlock the object has previously locked the object. Once the contents of the object header field are obtained, a determination is made in step 424 regarding whether the lock on the object is a re-entrant lock. In other words, a determination is made as to whether the contents of the object header field indicate that the object is also locked by a previous synchronized operation invoked by the thread on the object, in addition to the current synchronized operation which is associated with unlocking the object.

If it is determined that the lock is re-entrant, then in step 426, the indicator value which indicates that the lock is being used by a re-entrant synchronized operation is popped from the stack. As previously mentioned, the indicator value may be any suitable value which indicates that the header value of the object is stored in another location on the thread stack. Once the indicator value is removed, with respect to the current synchronized operation, the process of unlocking the object is considered to be completed. It should be appreciated, however, that the object is still locked by the same cooperative thread with respect to a previous synchronized operation performed by the same cooperative thread on the object.

If it is determined in step 424 that the lock is not re-entrant, then process flow moves to step 432 in which the header value is returned from the thread stack to the object header field. Once the header value is returned, the object is unlocked, and the process of unlocking the object is completed.

Concurrent threads are typically allowed to "study" an object or, more specifically, the contents of the header field of the object, irregardless of whether the object is locked or unlocked. In order to keep track of the status of an object which is associated with concurrent threads, the header field of the object may include a status indicator which indicates whether the object is locked, unlocked, or in the process of being studied. Using such a status indicator, it is possible for one thread to determine if another thread is currently studying the object.

Figure 5A:
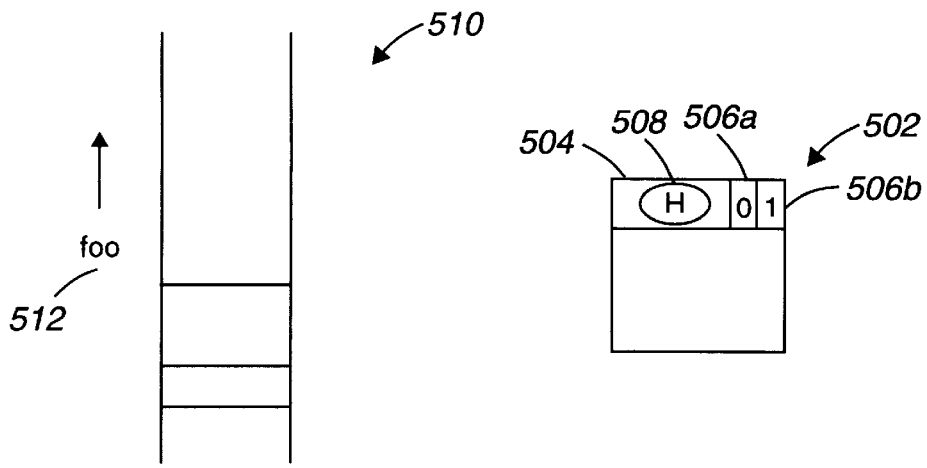
FIG. 5a is a diagrammatic representation of an object and a stack associated with a concurrent thread in accordance with an embodiment of the present invention.

FIG. 5a is a diagrammatic representation of an object and a stack which is associated with a concurrent thread in accordance with a second embodiment of the present invention. An object 502 includes a header field 504 whose contents include status indicator bits 506 and a header value 508. As shown, object 502 is unlocked, since header field 504 includes header value 508. Header value 508 generally includes information relating to object 502. By way of example, header value 508 may include, but is not limited to, information such as identity hash values and garbage collection information. Status indicator bits 506 are arranged to indicate whether object 502 is locked, unlocked, or busy. In the described embodiment, when a first status indicator bit 506a is "0," and a second status indicator bit 506b is "1," then the indication is that object 502 is unlocked.

Figure 5B:
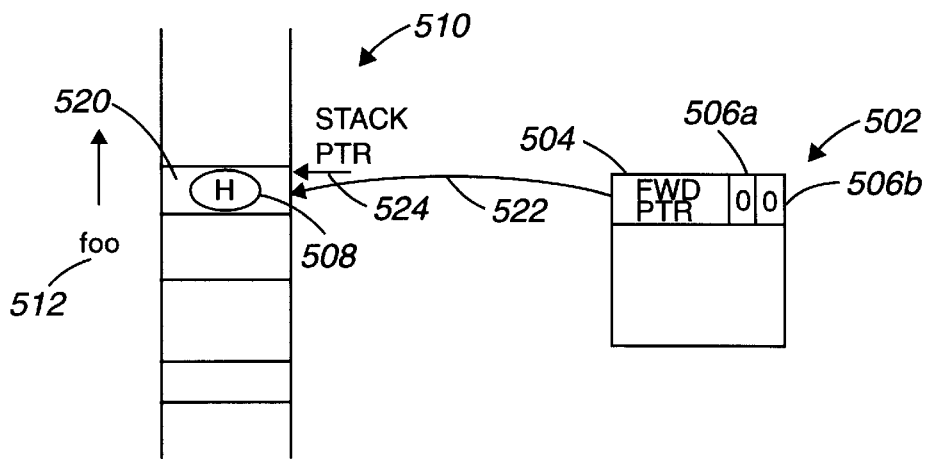
FIG. 5b is a diagrammatic representation of the object and the stack of FIG. 5a after the header value has been placed on the stack in accordance with an embodiment of the present invention.

An execution stack 510, which is local to a thread, is used when a synchronized operation, in this case a synchronized method foo 512, is invoked. When object 502 is involved in the execution of synchronized method foo 512, synchronized method foo 512 may only access object 502 when object 502 is not locked by another thread, and after the lock associated with object 502 has been locked by the first thread. FIG. 5b is a diagrammatic representation of object 502 after the thread associated with stack 510 has locked object 502. Header value 508 is now located on stack 510. Specifically, the location of header value 508 on stack 510 is a stack header location 520.

When header value 508 is located on stack 510, a forwarding pointer 522 is inserted in header field 504 to indicate where header value 508 is located. The presence of header value 508 on stack 510, in addition to the presence of forwarding pointer 522 in header field 504, indicates that object 502 is locked. Accordingly, status indicator bits 506 are set to indicate that object 502 is locked. In the described embodiment, when object 502 is locked, status indicator bit 506a is "0" and status indicator bit 506b is "0."

A stack pointer 524, which is associated with stack 510, is arranged to identify a current location, or memory address, within stack 510. In other words, the execution of synchronized method foo 512 typically involves accessing different memory addresses within stack 510. Stack pointer 524 is used to track the memory address which is currently in use during the execution of method foo 512. As shown, stack pointer 524 references stack header location 520.

Figure 5C:
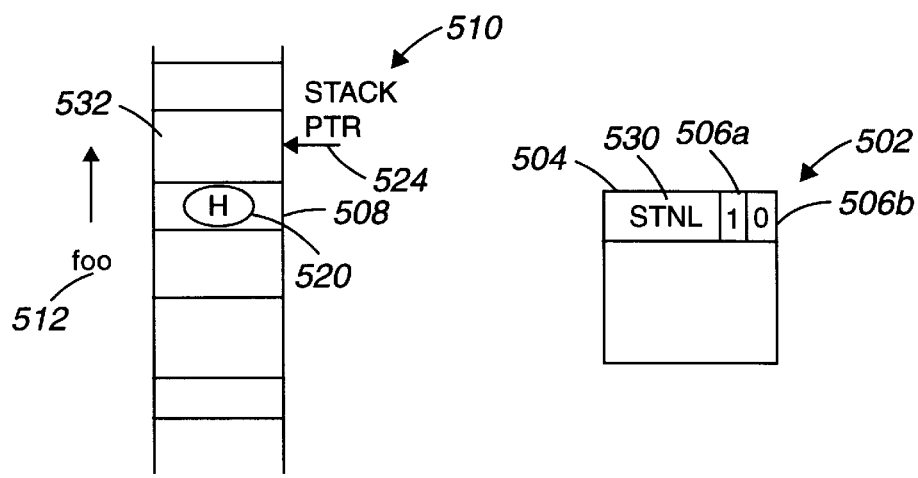
FIG. 5c is a diagrammatic representation of the object and the stack of FIG. 5b after a sentinel has been placed in the object header field in accordance with an embodiment of the present invention.

In a system which includes concurrent threads, a thread may "study" object 502 at substantially any time. By way of example, while header value 508 is on stack 510, a thread may study object 502. In one embodiment, a thread which is attempting to study locked object 502 may obtain contents of header field 504. FIG. 5c is a diagrammatic representation of stack 510 and object 502 of FIG. 5b, when a thread is studying the contents of header field 504. Stack pointer 524 is moved to a different location to indicate that the execution of method foo 512 has progressed with respect to FIG. 5b. As shown, while header value 508 is still located on stack 510, a thread, which may or may not be the thread associated with stack 510, temporarily replaces the contents of header field 504 with a sentinel 530. Sentinel 530 is generally a value that encodes an identifier for a thread, and may be distinguished from forwarding pointers and object header values. In the described embodiment, sentinel 530 replaces forwarding pointer 522, as shown in FIG. 5b, such that forwarding pointer 522 may be studied. It should be appreciated, however, that the contents of header field 504 that are replaced by sentinel 530 may also be a header value or another sentinel.

Sentinel 530 includes a stack pointer address into the stack associated with the thread which is studying object 502. In the embodiment shown, when synchronized method foo 512 is re-entrant or, in other words, when synchronized method foo 512 transitively invokes another synchronized method bar, object 502 may be re-accessed by the thread associated with stack 510. As such, sentinel 530 may include the address of location 532, as previously mentioned. Alternatively, sentinel 530 may include the address of a different location in a stack associated with a different synchronized method invocation which uses object 502.

The presence of sentinel 530 in the header field of object 502 indicates that object 502 is "busy." When object 502 is busy, the indication is that the thread is studying the object. Status indicator bits 506 may be arranged to indicate that object 502 is busy. By way of example, status indicator bit 506a may be "1" and status indicator bit 506b may be "0" when object 502 is busy. In one embodiment, sentinel 530 may be considered to include status indicator bits 506.

Figure 6A:
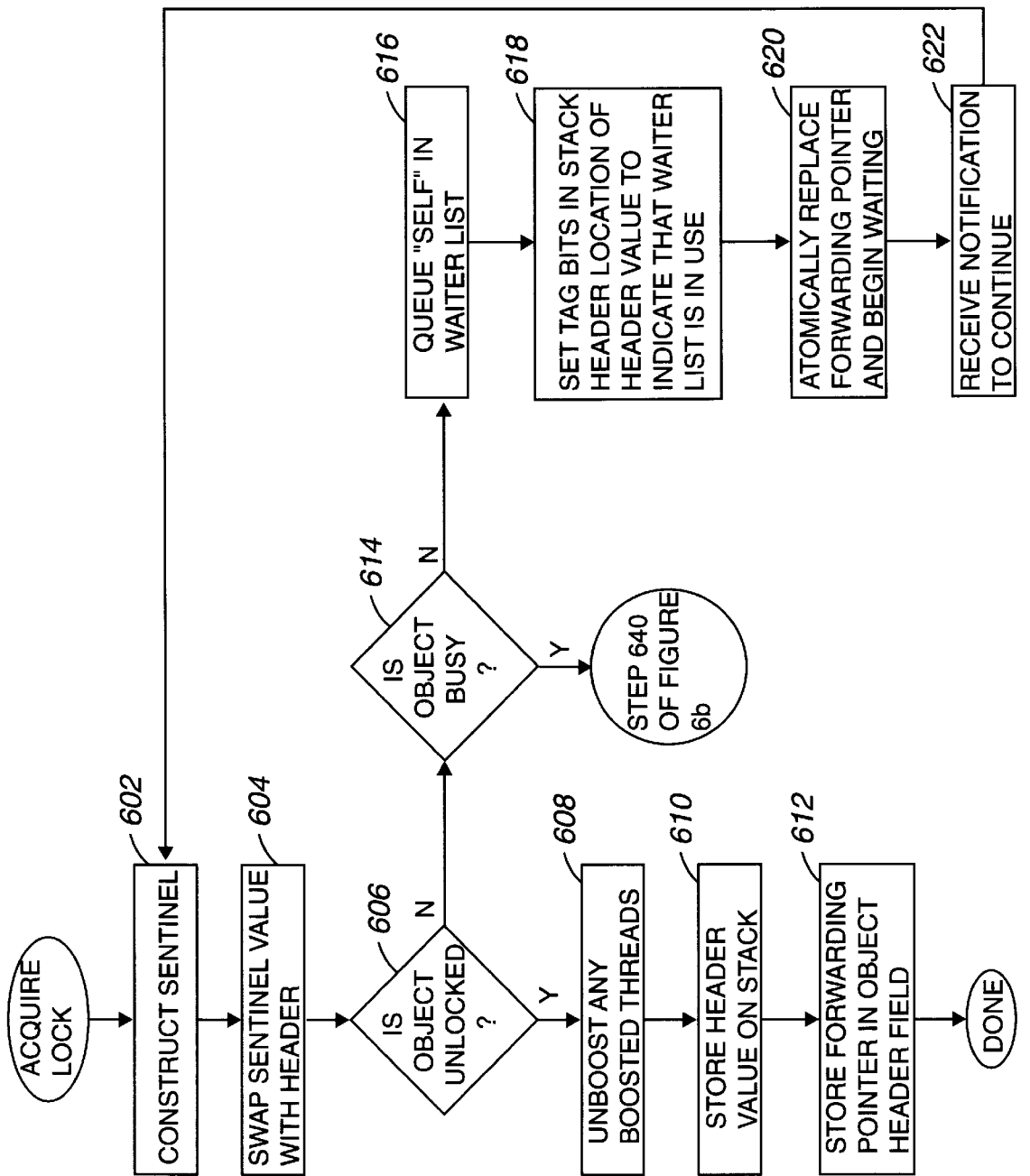
FIGS. 6a and 6b are a process flow diagram which illustrates the steps associated with acquiring an object lock of an object in accordance with an embodiment of the present invention.
Figure 6B:
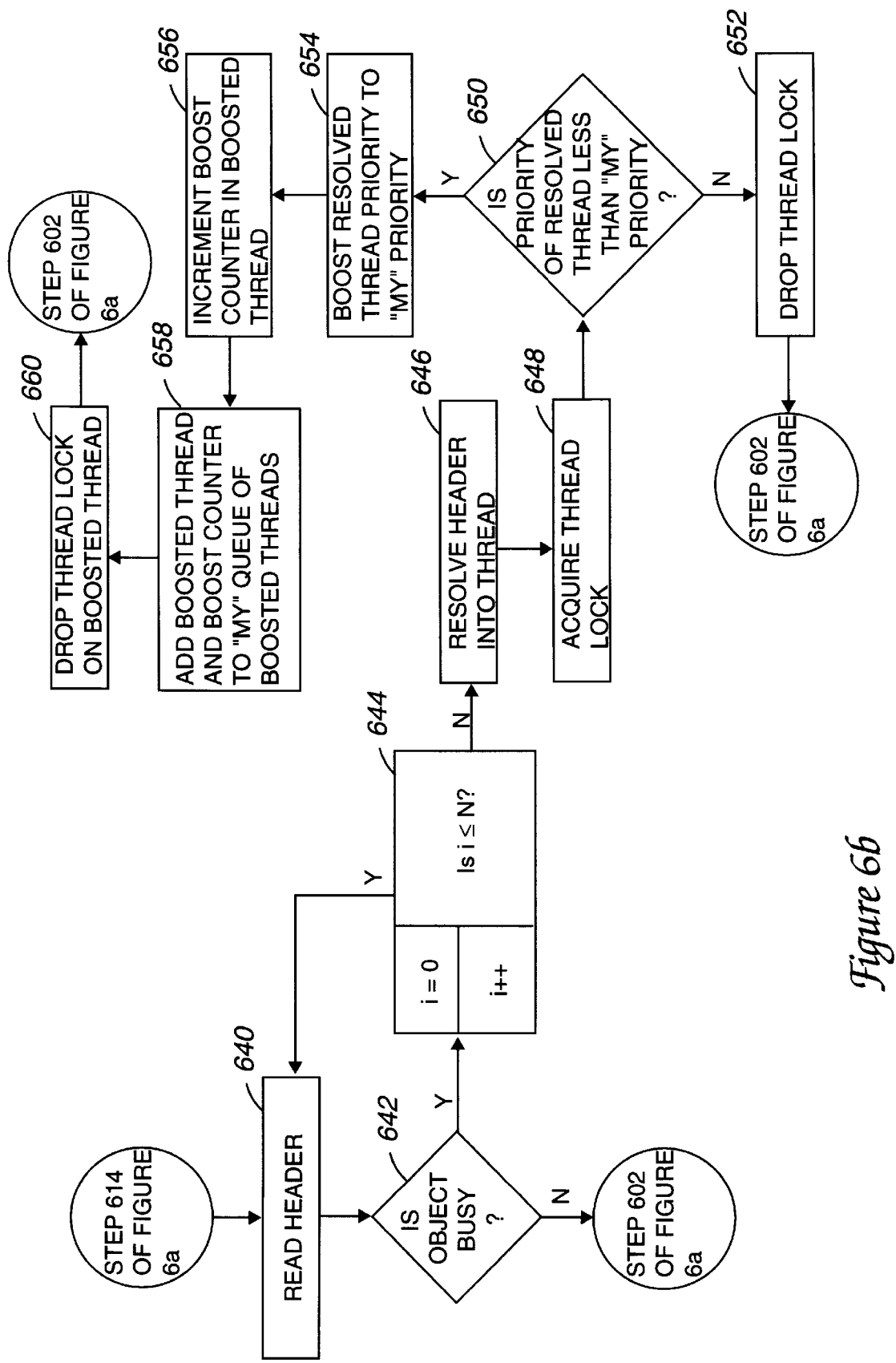

In order for a thread to acquire an object lock, e.g., acquire the header value for an object, the thread generally obtains and studies the object header field contents. FIGS. 6a and 6b are a process flow diagram which illustrates the steps associated with acquiring an object lock of an object using a concurrent thread in accordance with the embodiment of the present invention. The process begins in step 602, where a sentinel is constructed for the thread which is attempting to acquire the object lock, i.e., the "current thread." As previously discussed, a sentinel is arranged to identify an associated thread. In general, although the sentinel may be constructed using any suitable method, the sentinel may be constructed by performing bit operations to essentially add a status indicator to the stack pointer for the thread. Such a status indicator is, in the described embodiment, a busy tag which indicates that the object in which the sentinel is inserted is being "studied." As previously mentioned, the busy tag may be two bits, e.g., "1 0."

After the sentinel is constructed in step 602, the sentinel value is placed in a distinguished location which is local to the thread attempting to lock the object. The contents of that distinguished location is then swapped with the contents of the header field of the object, i.e., the object which is to be locked, in step 604. When the sentinel value in the distinguished location is swapped with the contents of the header field, the swapping is substantially atomic. As will be appreciated by those skilled in the art, atomically swapping the contents of the distinguished location with the contents of the header field implies that the contents of the distinguished location and the contents of the header field are swapped substantially instantaneously, without the possibility of any second concurrent thread, also attempting to study the object, observing a partially-swapped value in the header field of the object. That is, a second thread may attempt to study the object at approximately the same time as the first thread is attempting to study the object, and thus may perform a second independent swap of the contents of the local distinguished location of the second thread with the contents of the header field of the object. Because the swapping is substantially atomic, following the swap by the second thread the distinguished location of the second thread will either contain the contents of the header field of the object before the first thread was able to swap it, or the sentinel value of the first thread.

Process flow moves from step 604 to step 606 where a determination is made regarding whether the object is unlocked. The status indicator, or tag, bits of the value in the header field of the object may be used to determine if the object is unlocked. For example, as described above with respect to FIG. 5a, in one embodiment, when the status indicator bits are "0 1," the object is unlocked. If it is determined in step 606 that the object is not unlocked, then the implication is that the object is either busy, i.e., being studied by another thread, or already locked. That is, if the object is not unlocked, the object header field either holds a sentinel value associated with another thread, or a forwarding pointer which identifies the thread which has locked the object. If the object is not unlocked, then a determination is made in step 614 regarding whether the object is busy.

When it is determined in step 614 that the object is not busy, then, in the described embodiment, the object has been determined by the current thread to be locked by a second thread, and the contents of the object header field obtained by the current thread in the swap will be the forwarding pointer of the second thread which currently holds the lock on the object being studied. Accordingly, process flow proceeds to step 616 where the current thread queues itself in the waiter list associated with the thread stack on which the header value is stored, as will be described below with respect to FIG. 7. After the thread queues itself in the waiter list, the tag bits in the stack header location of the header value of the object are set to indicate that the waiter list is in use in step 618, as will be discussed below with reference to FIG. 7. In general, the current thread may queue itself in the waiter list of any thread which has possession of the header value of the object which is to be locked.

After the tag bits in the stack header location are set, process flow moves to step 620 where the contents obtained from the header field in step 604, i.e., a forwarding pointer of a second thread, are atomically returned to the object header field. Once the contents are returned, the thread begins waiting for notification to continue executing. When notification to continue execution is received in step 622, process flow returns to step 602 where a new sentinel is constructed and the entire process, as described above, is repeated in an attempt to acquire the lock.

Returning to step 614, it will be appreciated that there will be times when the object is busy. When an object is busy, the object is being studied by another thread. A busy object may be locked or unlocked. However, since another thread is studying the object, the current thread, or the thread that is attempting to lock the object, is only able to determine that the thread is busy, and is unable to determine whether the object is locked or unlocked. When it is determined that the object is busy in step 614, then in step 640, the contents of the header field of the object are read. Once the header field contents are read, a determination is made in step 642 as to whether the object is busy.

If it is determined in step 642 that the object is busy, then in step 644, a determination is made regarding whether the current thread should continue actively attempting to study the object. Although a busy object is being studied by another thread, the other thread will eventually complete studying the object. As such, the current thread may be able to access the object at a time when the object is no longer busy.

A determination of whether to continue actively attempting to study the object in step 644 may be dependent on any number of factors. By way of example, the determination may be dependent upon a virtual machine, e.g., a Java™ Virtual Machine which is arranged to execute programs written in the Java™ programming language developed by Sun Microsystems, Inc. of Mountain View, Calif., with which the object is associated. One example of a virtual machine which is suitable for implementing the present invention will be described below with respect to FIG. 13.

The number of repeated attempts "N" to lock the object may be widely varied, and may depend on factors which include, but are not limited to, the amount of memory available on the associated system. By way of example, in a system with only a single central processing unit (CPU), it is possible that no repeated attempts may be made, as only a single thread is executing at any particular time in such a system. In general, the number of attempts increases with the number of CPUs associated with the system, although it should be appreciated that the number may also be random.

When it is determined that another attempt is to be made to study the object, then process flow moves from step 644 to step 640 where the value of the object header field of the object is read. In general, when a thread continues attempting to study the object until it is finally successful, the thread is executing a spin lock. Alternatively, if it is determined in step 644 that no other attempts are to be made to study the object, then in step 646, the value read from the object header field in step 640 is resolved into a thread. In general, when an object is busy, the object header field of the object contains a sentinel value which identifies a thread which is currently studying the object. Hence, resolving the value read from the object header field, which has been determined to be a sentinel, into a thread involves locating the thread that is identified by the sentinel.

Once the value read from the object header field is resolved into a thread, the thread lock associated with the resolved thread is acquired in step 648 by the thread that is attempting to lock the object. Herein, for purposes of clarity, the thread that is attempting to lock the object will be referred to as the locking, or current, thread. In step 650, a determination is made regarding whether the execution priority associated with the resolved thread is less than the priority of the locking thread. In general, a thread with a lower execution priority will not be allowed to execute until no threads with higher execution are able to execute. If the determination is that the priority associated with the resolved thread is either the same as or greater than the priority of the locking thread, then the thread lock of the resolved thread is dropped in step 652. After the thread lock is dropped, process flow returns to step 602 where a new sentinel is constructed and the process of attempting to acquire an object lock repeats.

If the determination in step 650 is that the priority of the resolved thread is less than the priority of the locking thread, then process flow moves to step 654 where the priority of the resolved thread is boosted, or promoted. In the described embodiment, the priority of the resolved thread is boosted to the execution priority of the locking thread. In general, any suitable method may be used to boost the priority of the resolved thread. By way of example, a call may be made to an operating system associated with the threads to invoke operating system methods which are suitable for changing the priority of threads. Boosting the priority of the thread which is identified by the object header field generally prevents stalls in the execution of threads, as will be discussed below with respect to FIGS. 8a through 8e. Boosting the priority of a thread typically guarantees progress in the execution of a computer program. That is, boosting the priority of a thread essentially ensures that as computational cycles are granted to the execution of the program, at least some of the granted cycles will be made available to the resolved thread, thereby contributing to its completion of its study of the object that the locking thread desires to lock. Because the resolved thread will generally complete its study of the object, in one embodiment, the locking thread will eventually be guaranteed an opportunity to study the object. As such, the locking thread will subsequently be able to go on to perform "useful" work.

After the priority of the resolved thread is boosted, the boost counter in the newly boosted thread is incremented in step 656. The boost counter, which effectively operates as a time stamp, indicates when the boosted thread, i.e., the priority of the boosted thread, was last boosted. Process flow moves from step 656 to step 658 where the boosted thread and the boost counter are added to the queue of boosted threads that is associated with the locking thread. The queue of boosted threads is essentially a data structure that is used by the locking thread to track threads that have been boosted by the locking thread. In one embodiment, the queue is a list of substantially all threads which have been boosted by the locking thread.

Once the queue of boosted threads that is associated with the locking thread is updated with the boosted thread and incremented boost counter, the thread lock of the boosted thread is dropped by the locking thread in step 660. Then, process flow returns to step 602 where a new sentinel value is constructed and the process of attempting to lock an object continues.

Referring back to step 642, when it is eventually determined that a previously busy object is no longer busy, then the implication is that any thread which was previously studying the object is no longer studying the object. As such, if it is determined in step 642 that the object is not busy, then process flow returns to step 602 where a new sentinel is constructed, and another attempt is made at locking the object.

Eventually, the object which the locking thread desires to lock will be determined to be unlocked. That is, in general, the locking thread will eventually be allowed to acquire the object lock. Returning to step 606, if it is determined that the object is unlocked, then in step 608, any boosted threads associated with the locking thread are unboosted. In other words, any threads which may have had their priorities boosted by the locking thread are returned to their assigned priorities, as will be described below with respect to FIG. 11. After any boosted threads are unboosted in step 608, the object header field contents are stored on the stack of the locking thread in step 610. Since the object was determined to be unlocked in step 606, the header value for the object had been contained in the object header field. Therefore, step 610 entails storing the header value on the stack in a stack header location. After the header value is stored on the stack, a forwarding pointer which identifies the stack header location is inserted, or stored, in the object header field in step 612, and the process of acquiring an object lock is completed.

Figure 7:
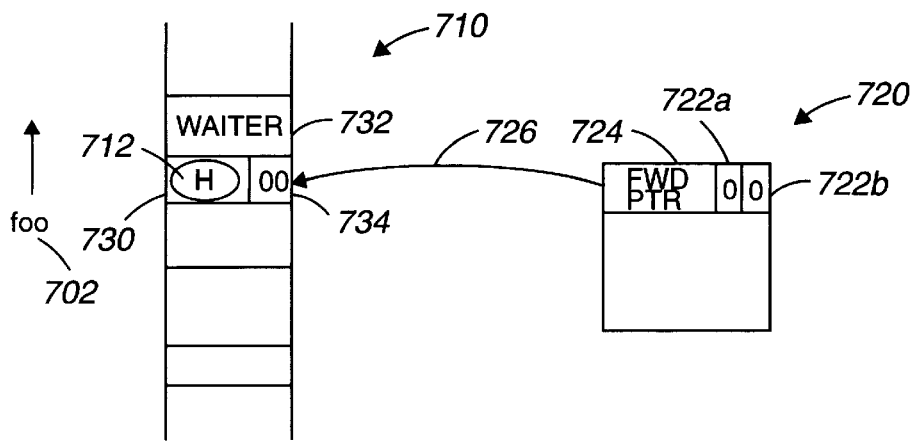
FIG. 7 is a diagrammatic representation of an object and a stack which includes a waiter list in accordance with an embodiment of the present invention.

With reference to FIG. 7, tag bits in a stack header location, as mentioned above with respect to step 618 of FIG. 6a, will be described in accordance with an embodiment of the present invention. When a synchronized operation is to be performed, as for example a synchronized method foo 702 is to be invoked, the execution of synchronized method foo 702 is performed on a stack 710 that is associated with a thread. When a header value 712 associated with an object 720 is stored on stack 710, object 720 is considered to be locked. As described above with respect to FIG. 5b, the locked status of object 720 may be indicated in the contents of an object header field 724 by status indicator bits 722, as well as by the presence of a forwarding pointer 726.

Header value 712 is stored on stack 710 in a stack header location 730 by the thread associated with stack 710. When, during the period in which the first thread holds the lock on object 720, a second thread desires to execute a synchronized operation on object 720, the second thread may be required to wait for the lock on object 720 to become available. The second thread waits for the lock on object 720 to become available by placing itself in a waiter list 732 on stack 710. In general, if any second thread attempts to perform a synchronized operation on object 720 when header value 712 is on stack 710, that is, when the first thread holds the lock on object 720, the second thread stores itself in waiter list 732. When any thread is stored in waiter list 732, that thread does not execute until notification is received, as for example from an operating system, that object 720 is free. A tag indicator 734, which is located in stack header location 730, is arranged to indicate that waiter list 732 includes a stored thread. Therefore, when object 720 is eventually unlocked, tag indicator 734 may be used to facilitate a notification that a thread stored in waiter list 732 may continue to execute and attempt to lock object 720. In the embodiment shown, tag indicator 734 includes two tag bits.

In a concurrent threading model, when several concurrent threads are concurrently trying to study an object, the priorities assigned to the concurrent threads often affects when and if a particular thread will be allowed to study the object. In general, threads with a higher execution priority will obtain the right to study the object before threads with a lower execution priority will obtain the right to study the object. However, it is possible that a thread with a lower priority will initially obtain the right to study an object, then be forced to give up control, i.e., are preempted, because a thread with a higher priority has become "runnable." In effect, the thread with the lower priority thus prevents the thread with a higher priority from studying the object, because the thread with the higher priority, upon attempting to swap a sentinel value for the contents of the object header field, will find the sentinel value of the thread with the lower priority in the object header field. At the same time, the thread with the lower priority is unable to execute and thus finish studying the object because the thread with the higher priority is runnable and so will be run in favor of the thread with the lower priority. As a result, neither the thread studying the object nor the thread desiring to study the object is able to make progress.

Figure 8A:
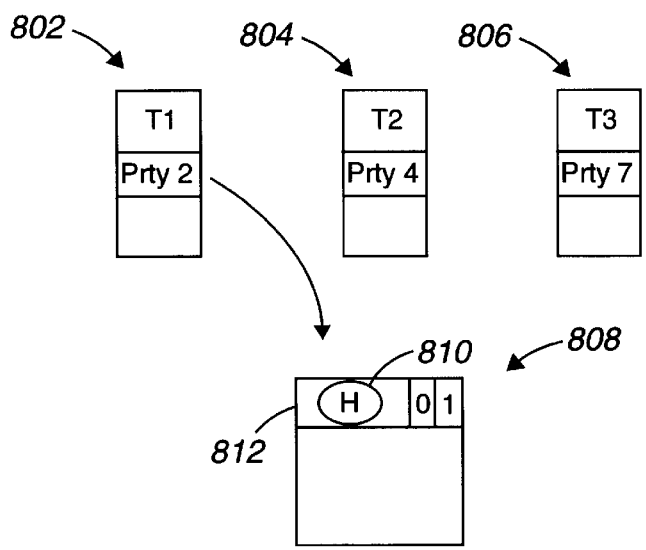
FIG. 8a is a diagrammatic representation of a set of threads with different priorities which are arranged to interface with an object in accordance with an embodiment of the present invention.

FIG. 8a is a diagrammatic representation of a system with three threads which are all attempting to study a single object in accordance with an embodiment of the present invention. As shown, a first thread 802 has a priority of "2," which indicates that the execution priority of first thread 802 is relatively low. A second thread 804 has an execution priority of "1," which is higher than the priority assigned to first thread 802. A third thread 806 has an execution priority of "7," which is higher than the priorities assigned to both first thread 802 and second thread 804.

Figure 8B:
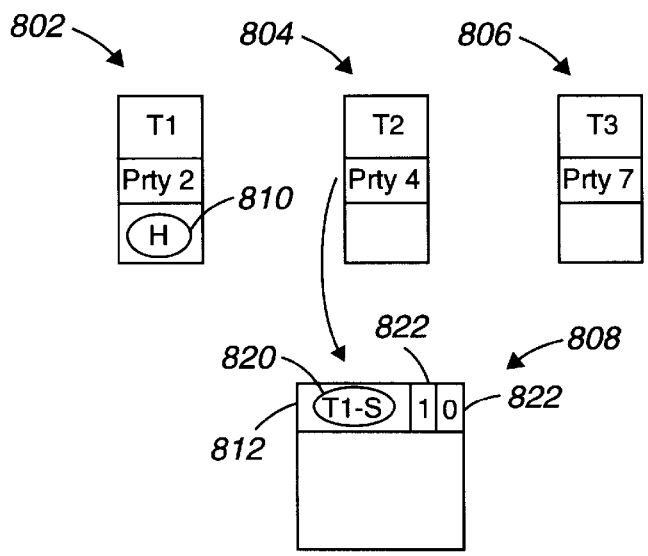
FIG. 8b is a diagrammatic representation of the set of threads of FIG. 8a after a low priority thread obtains the header value of the object in accordance with an embodiment of the present invention.

Priorities are assigned such that when a thread with a higher priority attempts to study a particular object, a thread with a lower priority is prevented from studying the object until all threads with a higher priority are substantially through with studying the object. By way of example, when third thread 806 is running and attempts to study an object 808, a thread with a lower priority, e.g., first thread 802, is generally prevented from studying object 808 until thread 806 has finished studying object 808. However, in the event that first thread 802 begins execution prior to second thread 804 and third thread 806, first thread 802 may swap a sentinel value with the contents of object header field 812 of object 808, obtaining an object header value 810 from object 808 as a result of the swap. As shown in FIG. 8b, the contents of object header field 812 include a header value 810.

In one embodiment, when the contents of object header field 812 are obtained by first thread 802, a first sentinel 820 is swapped into object header field 812. Although first sentinel 820 may be substantially any suitable value which identifies first thread 802, first sentinel 820 is typically an address of a stack pointer associated with first thread 802. First sentinel 820 is swapped into object header field 812 to identify first thread 820 as the thread which is studying object 808 and, hence, is keeping object 808 "busy," as indicated by status indicator bits 822.

After first thread 802 obtains contents of object header field 812 and determines that the obtained contents of object header field 812 include header value 810, first thread 802 typically attempts to replace first sentinel 820 in object header field 812 with a forwarding pointer identifying the first thread. However, when a thread with a higher priority, as for example second thread 804, accesses object 808 before first thread 802 replaces first sentinel 820 in object header field 812 with a forwarding pointer, first thread 802 is prevented from finishing its study of object 808.

Figure 8C:
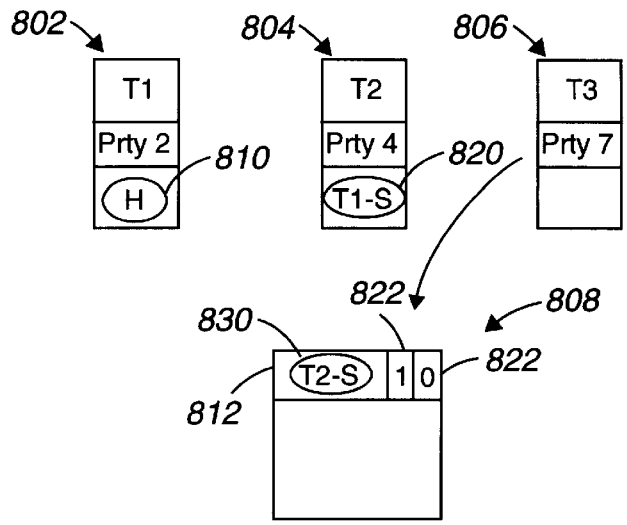
FIG. 8c is a diagrammatic representation of the set of threads of FIG. 8b after a medium priority thread swaps a sentinel for the object header contents in accordance with an embodiment of the present invention.

When second thread 804 obtains the contents of object header field 812, second thread 804 essentially obtains first sentinel 820, and places a second sentinel 830 in object header field 812, as shown in FIG. 8c. Second sentinel 830, in one embodiment, is an address of a stack pointer associated with second thread 804. Since the contents of object header field 812 obtained by second thread 804 include first sentinel 820, and not header value 810, second thread 804 will generally continue to attempt to study object 808 until it is successful.

Figure 8D:
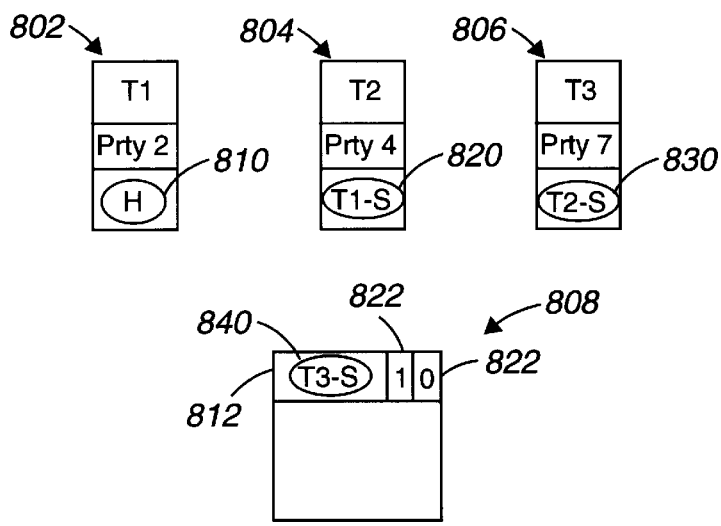
FIG. 8d is a diagrammatic representation of the set of threads of FIG. 8c after a high priority thread swaps a sentinel for the object header field contents in accordance with an embodiment of the present invention.

As previously mentioned, second thread 804 has a lower priority than third thread 806. Therefore, if third thread 806 accesses the contents of object header field 812 before second thread 804 is able to complete studying object 808 but after it has made an attempt to study object 808, then as a result of swapping its sentinel value for the contents of object header field 812, third thread 806 obtains second sentinel 830, and places third sentinel 840 in object header field 812, as shown in FIG. 8d. Third sentinel 840, in one embodiment, is an address of a stack pointer associated with third thread 806. Since the contents of object header field 812 obtained by third thread 806 include second sentinel 830, and not header value 810, third thread 806 will generally continue to attempt to study object 808 until it is successful.

Since third thread 806 has a higher priority than second thread 804 and first thread 802, as long as third thread 806 is running, neither second thread 804 nor first thread 802 may continue running and access object 808. However, third thread 806 will generally be unable to obtain header value 810 until first thread 802 has completed execution and eventually restores header value 810 in object header field 812. As such, a "starvation problem" arises. A starvation problem essentially occurs when the thread which has begun to study an object may not complete studying the object because another thread with a higher priority, which itself wants to study the object, is executing and, hence, preventing the thread which has begun to study the object from completing its study.

In one embodiment, the thread with the highest priority, e.g., third thread 806, which is also the running thread, may temporarily boost the priorities of another thread in order to resolve starvation problems. In this example, third thread 806 has received the sentinel value for second thread 804 as a result of attempting to study object 808. The fact that third thread 806 received the sentinel value for second thread 804 when attempting to study object 808 indicates that the continued progress of third thread 806 "depends on" the continued progress of second thread 804. Hence, continued progress of third thread 806 may be ensured in the event that continued progress of second thread 804 may be ensured. Because third thread 806 is currently running, in general threads of the same priority as third thread 806 would also be able to run. Thus, third thread 806 may eventually cause itself to run if it may cause second thread 804 to run by boosting the priority of second thread 804 to that of third thread 806.

The sentinel value for second thread 804, received by the third thread 806 when attempting to study object 808, includes a pointer into the execution stack of second thread 804. Second thread 804 may use this pointer into the execution stack of second thread 804 to identify second thread 804, and may use that identification to boost the priority of second thread 804 to match the priority of third thread 806. Boosting the priority of second thread 804 to the priority of third thread 806 would permit second thread 804 to be run substantially as frequently as third thread 806.

Figure 8E:
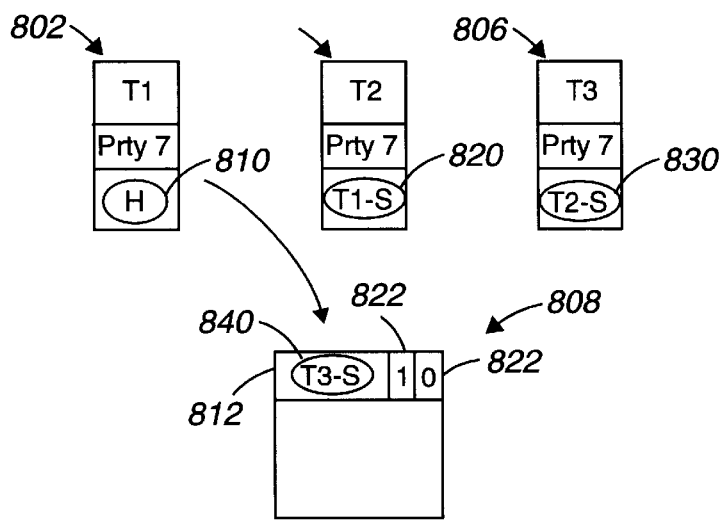
FIG. 8e is a diagrammatic representation of the set of threads of FIG. 8d after the high priority thread assigns its priority to the medium priority thread and the low priority thread in accordance with an embodiment of the present invention.

In turn, second thread 804 may run, and may itself determine that it has received the sentinel value for first thread 802 when attempting to study object 808. The fact that second thread 804 received the sentinel value for first thread 802 when attempting to study object 808 indicates that the continued progress of second thread 804 depends on the continued progress of first thread 802. The sentinel value for first thread 802, received by the second thread 804 when attempting to study object 808, includes a pointer into the execution stack of first thread 802. Second thread 802 may use this pointer into the execution stack of first thread 802 to identify second thread 802, and may use that identification to boost the priority of first thread 802 to match the priority of second thread 806. Boosting the priority of first thread 802 to the priority of second thread 804 would permit first thread 802 to be run as frequently as second thread 806. As will be appreciated by those skilled in the art, the priority of the running thread, third thread 806, may be propagated to second thread 804, thereby causing second thread 804 to run. When second thread 804 runs as a result of its priority being boosted, second thread 804 may further propagate its priority to first thread 802. If the priority of third thread 806 was initially "7," the result is that second thread 804 and first thread 802 will eventually be boosted to priority "7," as shown in FIG. 8e. Having had its priority boosted to priority "7," first thread 802 may now run as frequently as third thread 806 and second thread 804, and, as such, may complete its study of object 808. The study of object 808 by first thread 802 having been completed, second thread 804 and third thread 806 may productively resume attempting to study object 808.

Figure 9:
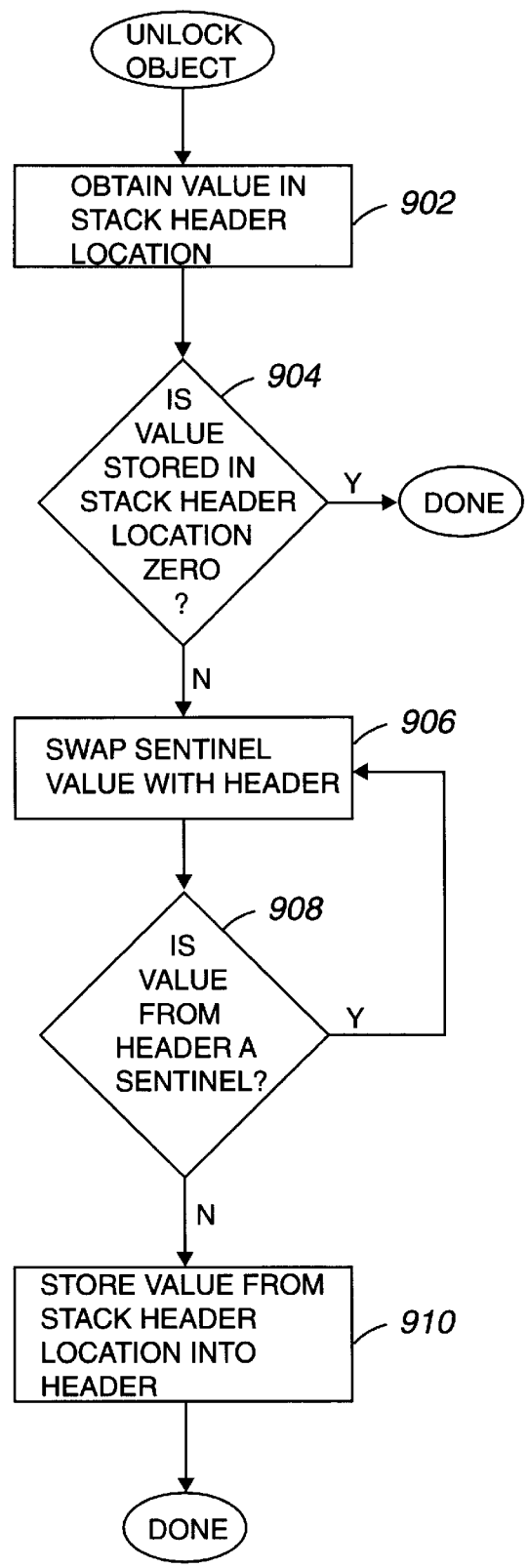
FIG. 9 is a process flow diagram which illustrates the steps associated with one method of unlocking a locked object in accordance with an embodiment of the present invention.

In order for a thread which possesses an object lock to unlock an object, the thread generally studies the object to determine if the contents of the object indicate that it is possible to unlock the object. FIG. 9 is a process flow diagram which illustrates the steps associated with one method of unlocking a locked object in accordance with a third embodiment of the present invention. Initially, when a thread attempts to unlock an object, the value in the identified stack header location on the stack associated with the thread is obtained in step 902. In general, the stack header location is identified by the stack pointer that is associated with the stack.

After the value in the stack header location is obtained in step 902, a determination is made in step 904 regarding whether the value that was obtained from the stack header location indicates that the stack header location does not contain the header value from the object. In the described embodiment, such a determination is a determination of whether the value that was obtained from, or stored in, the stack header location is the indicator value that is used to indicate that the lock has been entered re-entrantly. If the determination is that the value stored in the stack header location is such an indicator value, then the implication is that the object may not be fully unlocked, since the thread is still holding the header value of the object in another stack location. If the value that was obtained from the stack header location is the indicator value, the process of unlocking the object is considered to be completed. In general, when it is determined in step 904 that the value stored in the stack header location is the indicator value, the indicator value may be popped from the stack, as will be appreciated by those skilled in the art.

If it is determined in step 904 that the value stored in the stack header location is not the indicator value, then process flow proceeds to step 906 in which a sentinel value associated with the thread is swapped with the header of the object which is to be unlocked. In the described embodiment, the sentinel value is stored in a distinguished location which is atomically swapped with the contents of the object header field. Once the sentinel value is swapped with the contents of the object header field in step 906, a determination is made regarding whether the value that was swapped from the object header field is a sentinel. If the value that was swapped from the object header field is a sentinel, then the indication is that the object that is to be unlocked is busy, e.g., being "studied" by another thread. As such, when the value that was swapped from the object header field is a sentinel, then process flow returns to step 906 where the sentinel value associated with the thread is once again swapped with the contents of the object header field.

When it is determined in step 908 that the value that was swapped from the object header field is not a sentinel, then the value from the stack header location is stored into the object header field of the object in step 910. In the described embodiment, the value in the stack header location is the header value of the object. Therefore, storing the header value into the object header field of the object restores the object to an unlocked state, since substantially any thread is free to acquire the header value of the object. Thus, once the header value is restored in the object header field of an object, the process of unlocking an object is considered to be completed.

Repeatedly swapping a sentinel value with the contents of an object header field in step 906, and determining whether swapped out contents of the object header field is a sentinel in step 908, may be considered to be a spin lock, since process flow continues to "spin" between steps 906 and 908 which are repeated until the value obtained from the object header field is no longer a sentinel. In some embodiments, the spin lock may stall the process of executing methods which use the object which is being unlocked. By way of example, while the thread executing the spin lock is swapping a sentinel value for the contents of the object header field, another thread may be essentially prevented from storing its sentinel value into the object header field in preparation for releasing the lock, thereby preventing the lock on the object from being released as well as preventing the thread executing the spin lock from making progress.

In order to prevent stalls in execution which arise, for example, when a lock on an object is prevented from being released, the priorities associated with threads may be temporarily boosted. The boosting of the priorities of threads, as was previously described, enables lower priority threads to be promoted to the priority of a currently running thread. The boosting of threads enables a previously lower priority thread to continue running such that the normally lower priority thread may remove finish studying the object, thereby removing its sentinel value from the object header field of the object being studied.

Figure 10A:
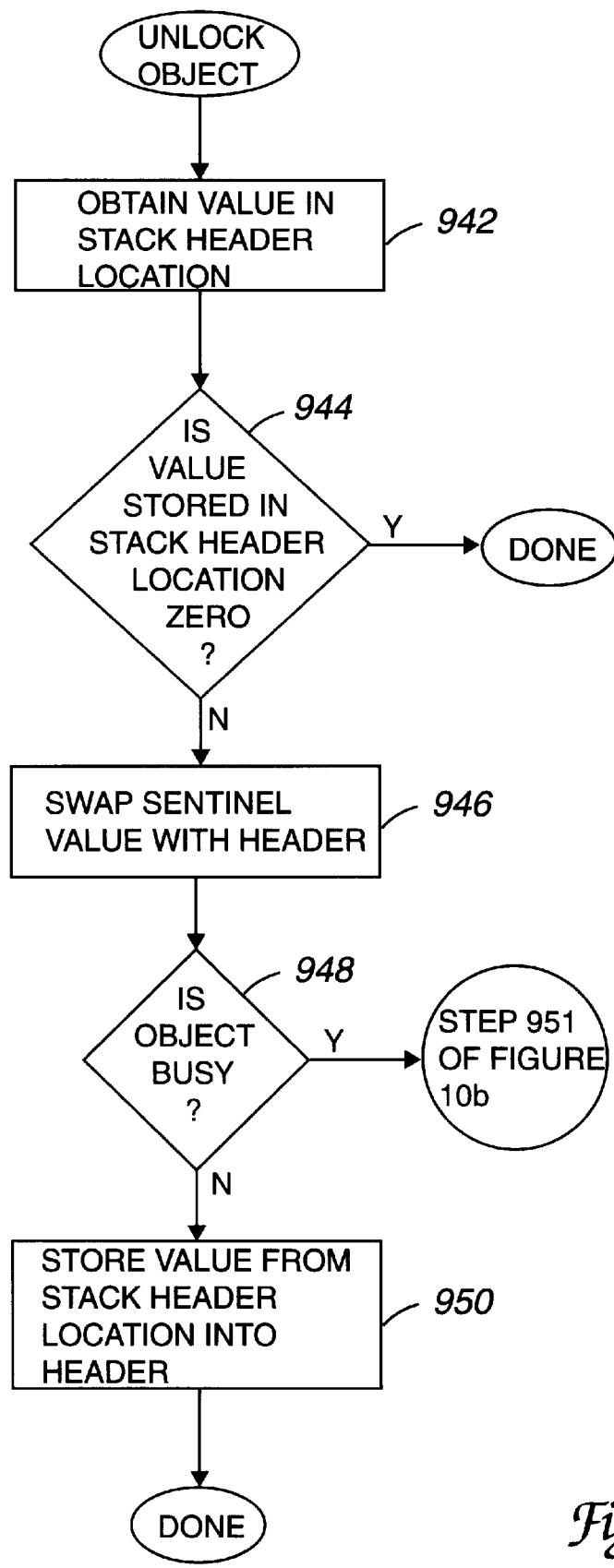
FIGS. 10a and 10b are a process flow diagram which illustrates the steps associated with a second process of unlocking a locked object in accordance with an embodiment of the present invention.
Figure 10B:
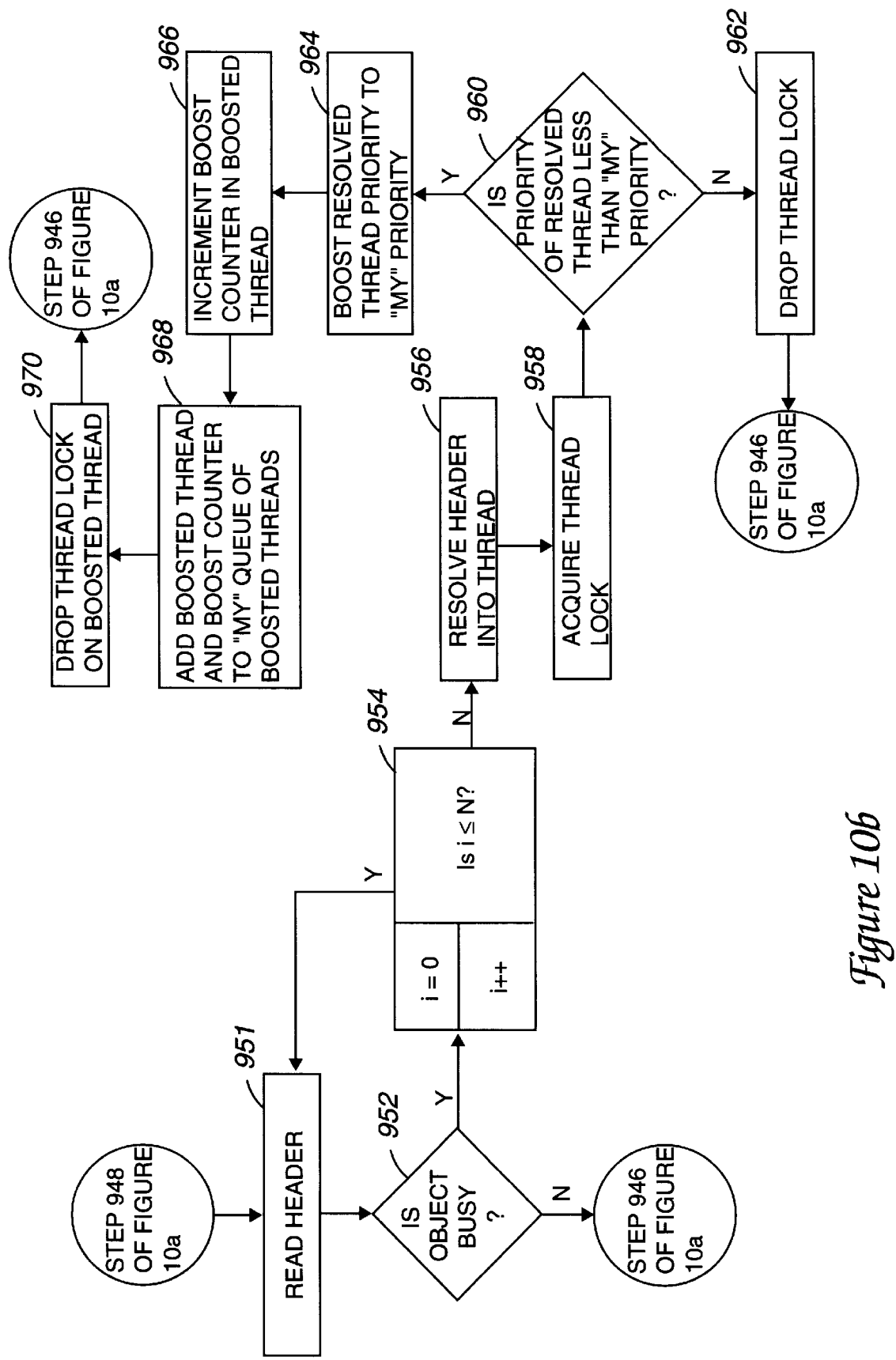

Referring next to FIGS. 10a and 10b, a second process of unlocking a locked object, through the use of boosting priorities, will be described in accordance with a fourth embodiment of the present invention. To unlock an object, the header value associated with the object is typically replaced in the object header field of the object. When a thread attempts to unlock an object, the value stored in the stack header location identified by a stack pointer is obtained in step 942. It should be appreciated that the stack pointer points into the stack associated with the thread which is attempting to unlock the object, or the "current thread." In the described embodiment, the current thread is a concurrent thread.

After the value in the stack header location is obtained in step 942, a determination is made in step 944 regarding whether the value that was obtained from the stack header location indicates that the stack header location does not contain the header value from the object. In the described embodiment, such a determination is a determination of whether the value that was obtained from, or stored in, the stack header location is the indicator value that is used to indicate that the lock has been entered re-entrantly. If the determination is that the value stored in the stack header location is such an indicator value, then the implication is that the object may not be fully unlocked, since the thread is still holding the header value of the object in another stack location. If the value that was obtained from the stack header location is the indicator value, the process of unlocking the object is considered to be completed. In general, when it is determined in step 944 that the value stored in the stack header location is the indicator value, the indicator value may be popped from the stack, as will be appreciated by those skilled in the art.

If the value that was obtained from the stack header location is not the indicator value, then process flow proceeds to step 946 in which a sentinel value associated with the thread is swapped with the contents of the object header field of the object which is to be unlocked. As previously mentioned, the swap operation used to swap the sentinel value and the contents of the object header field is an atomic operation, or an operation which is substantially atomic. From step 946, process flow proceeds to step 948 where a determination is made regarding whether the object is busy. While an indication that the object is busy may take any suitable form, in one embodiment, the tag bits in the contents of the header field of the object are used to indicate that the object is busy, e.g., another thread is currently studying the object, as described above with respect to FIG. 5c.

If the object is determined not to be busy in step 948, then the value in the stack header location is stored into the object header field of the object in step 950. When the object is not busy, in one embodiment, the indication is that the value that had been in the object header field prior to the swap was a forwarding pointer referring to the stack of the current thread, i.e., the thread which is unlocking the lock. Once the value of the stack header location is stored into the header field of the object, the process of unlocking the object is completed.

At times, the object may be busy, as for example when another thread is studying the object to determine the status of the object. Returning to step 948, if the determination is that the object is busy, the implication is that another thread is in the process of studying the object, that is, determining whether the object is locked or unlocked. If the object is not busy, then process flow moves to step 951 where the header field of the object is read. The contents of the header field of the object is read, and in step 952, a determination is made as to whether the object is still busy. If it is determined that the object is not busy, then process flow returns to step 946 in which a sentinel value associated with the thread is once again swapped with the contents of the header field of the object which is to be unlocked.

If it is determined in step 952 that the object is busy, then in step 954, a determination is made regarding whether to continue to actively attempt to study the object. The number of repeated attempts N may be widely varied, as discussed with respect to FIG. 6b, and may depend on factors which include, but are not limited to, the amount of memory associated with an associated system.

When it is determined that another attempt is to be made to study the object, then process flow moves from step 954 to step 951 where the contents of the header field of the object is read. The loop between steps 951, 952, and 954 may be considered to be a variation of a spin lock, since the loop continues until either the object is no longer busy, or until the predetermined number of repeated attempts "N" is exceeded.

Alternatively, if it is determined in step 954 that another attempt is not to be made to study the object, then in step 956, the value read from the object header field is resolved into a thread. In general, when an object is busy, the object header field of the object contains a sentinel value which identifies a thread which is currently studying the object. Hence, resolving the value read from the object header field, which has been determined to be a sentinel, into a thread involves locating the thread that is identified by the sentinel.

Once the value read from the object header field is resolved into a thread, the thread lock associated with the resolved thread is acquired in step 958 by the thread that is attempting to unlock the object. Herein, for purposes of clarity, the thread that is attempting to unlock the object will be referred to as the unlocking thread. In step 960, a determination is made regarding whether the priority associated with the resolved thread is less than the priority of the unlocking thread. If the determination is that the priority associated with the resolved thread is either the same as or greater than the priority of the unlocking thread, then the thread lock associated with the resolved thread is dropped in step 962. After the thread lock is dropped, process flow returns to step 946 in which a sentinel value associated with the thread is once again swapped with the contents of the header field of the object which is to be unlocked.

If the determination in step 960 is that the priority of the resolved thread is less than the priority of the unlocking thread, then process flow moves to step 964 where the priority of the resolved thread is temporarily boosted, or promoted. In the described embodiment, the priority of the resolved thread is boosted to the priority of the unlocking thread. Although any suitable method may be used to boost the priority of the resolved thread, a call is typically made to an operating system associated with the threads to invoke operating system methods which are suitable for changing the priority of threads.

After the priority of the resolved thread is boosted, the boost counter in the newly boosted thread is incremented in step 966. The boost counter, or time stamp, generally serves to indicate when the boosted thread, i.e., the priority of the boosted thread, was last boosted. As such, incrementing the boost counter essentially entails updating the boost counter. Process flow moves from step 966 to step 968 where the boosted thread and the boost counter are added to the queue of boosted threads that is associated with the unlocking thread. The queue of boosted threads may be considered to be a data structure that is used by the unlocking thread to track threads that have been boosted by the unlocking thread. In one embodiment, the queue is a list of substantially all threads which have been boosted by the unlocking thread.

Once the queue of boosted threads that is associated with the unlocking thread is updated with the boosted thread and corresponding boost counter, the thread lock of the boosted thread is dropped by the unlocking thread in step 970. Then, process flow returns to step 946 in which a sentinel value associated with the thread is once again swapped with the contents of the header field of the object which is to be unlocked.

Figure 11:
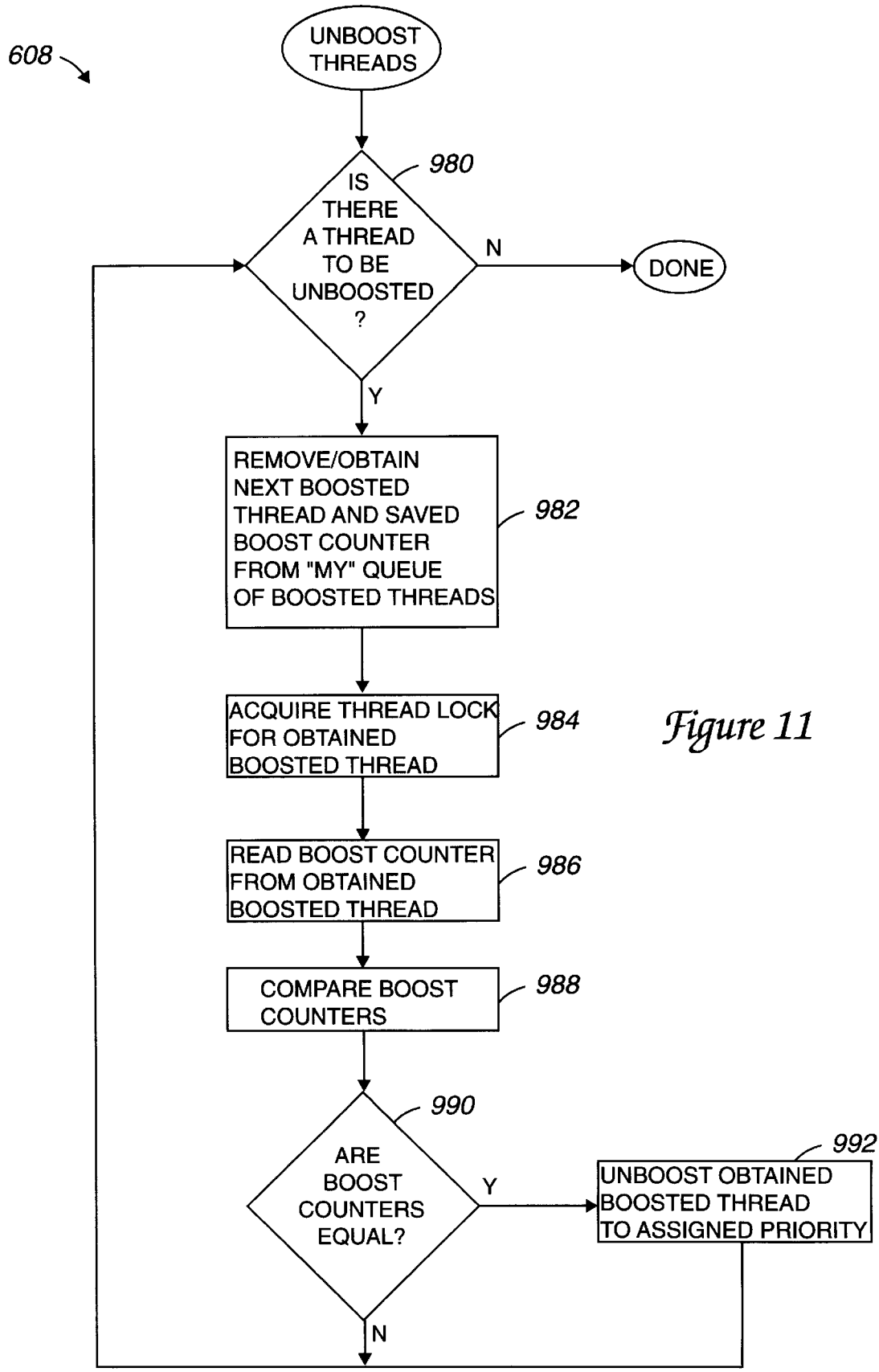
FIG. 11 is a process flow diagram which illustrates the steps associated with unboosting boosted threads using a thread, i.e., step 608 of FIG. 6a, in accordance with an embodiment of the present invention.

As previously mentioned, a thread with a boosted priority, i.e., a boosted thread, may have its priority unboosted, or otherwise returned, to its assigned priority. Although a boosted thread may unboost itself, in one embodiment, the thread which boosted the boosted thread is used to unboost the boosted thread. With reference to FIG. 11, a process of unboosting boosted threads using a thread which boosted the priority of the boosted thread will be described in accordance with an embodiment of the present invention. In other words, one embodiment of step 608 of FIG. 6a will be described.

A particular thread may call an operating system to unboost any boosted threads which that particular thread is at least partially responsible for boosting. In step 980, a thread determines whether it has previously boosted another thread. That is, a thread determines whether it is responsible for unboosting the priority of another thread that it may have boosted the priority of. Although any suitable method may be used to determine if there is a thread to be unboosted, one method involves searching through the queue of boosted threads that is associated with the thread, i.e., the "unboosting thread" or the "current thread," which will unboost the boosted threads. If it is determined in step 980 that there is no boosted thread which is to be unboosted, then the process of unboosting boosted threads is completed.

Alternatively, if it is determined in step 980 that there is a boosted thread that may need to be unboosted, then information pertaining to a thread that is to be unboosted is obtained in step 982. In one embodiment, the next boosted thread and an associated boost counter are removed from the queue of boosted threads that is associated with the unboosting thread. The boost counter obtained from the queue of boosted threads is typically arranged to indicate when the unboosting thread boosted the obtained boosted thread.

The thread lock that is associated with the obtained boosted thread is acquired in step 984. By acquiring the thread lock associated with the obtained boosted thread, the obtained boosted thread is temporarily prevented from having its priority changed by any other thread. In step 986, the boost counter from the obtained boosted thread is read. The boost counter from the obtained boosted thread is typically arranged to identify when the obtained boosted thread was last boosted and, therefore, may be considered to be a representation of a time stamp. It should be appreciated that when the assigned priority of a thread is greater than or equal to the boosted priority, then the boost counter of the thread is incremented.

After the boost counter from the obtained boosted thread is read, a comparison of the boost counter read from the obtained boosted thread and the boost counter obtained from the queue of boosted threads is made in step 988. Such a comparison is made to determine whether the obtained boosted thread was last boosted by the unboosting thread, or by a different thread. Step 990 is a determination of whether the boost counter read from the obtained boosted thread and the boost counter obtained from the queue of boosted threads are equal. In other words, a determination is made regarding whether the unboosting thread is recorded as the last thread to boost the obtained boosted thread.

If it is determined in step 990 that the boost counters are equal, then process flow proceeds to step 992 where the obtained boosted thread is unboosted to the assigned priority of the boosted thread. Unboosting the boosted thread also generally involves decrementing, or otherwise updating, the boost counter associated with the thread. It should be appreciated that the assigned priority is not necessarily the priority which was associated with the obtained boosted thread at the time the obtained boosted thread was boosted by the unboosting thread. The operating system with which the obtained boosted thread is associated may assign a new priority to the obtained boosted thread at substantially any time. By way of example, if a first thread with an original priority of "2" is boosted to a priority of "6" by a second thread, and is then assigned a priority of "4" by the operating system, when the second thread unboosts the first thread, the first thread is unboosted to a priority of "4." After the obtained boosted thread is unboosted in step 992, process flow returns to step 980 where a determination is made regarding whether the unboosting thread has previously boosted another thread which may need to be unboosted.

If the determination in step 990 is that the boost counters are not equal, then the indication is that another thread has more recently boosted the obtained boosted thread than the unboosting thread. As such, the obtained boosted thread is not unboosted by the unboosting thread, and process flow returns to step 980 where the unboosting thread determines whether it has previously boosted another thread.

Figure 12:
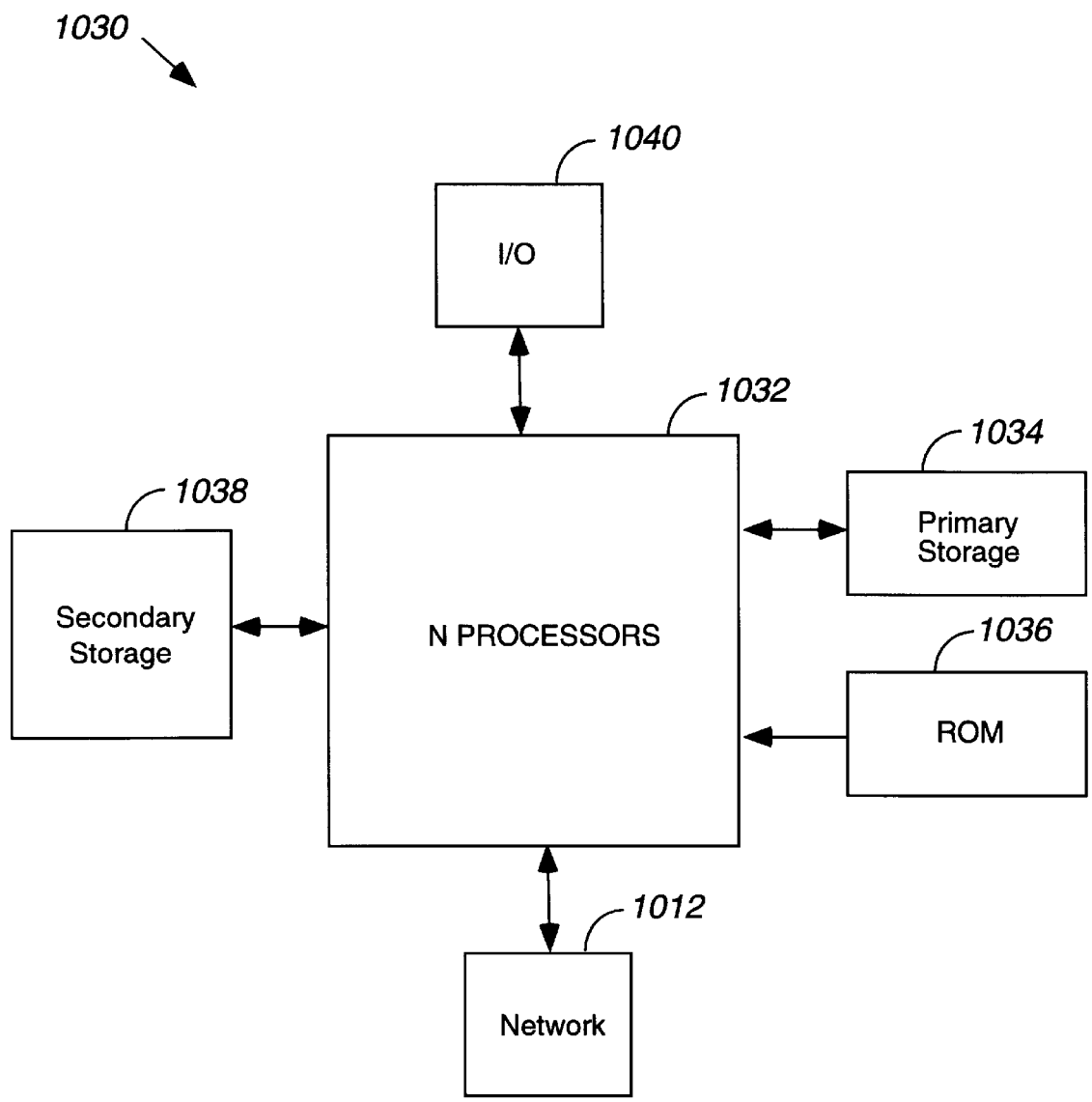
FIG. 12 is a diagrammatic representation of a general-purpose computer system suitable for implementing the present invention.

FIG. 12 illustrates a typical, general-purpose computer system suitable for implementing the present invention. The computer system 1030 includes any number of processors 1032 (also referred to as central processing units, or CPUs) that are coupled to memory devices including primary storage devices 1034 (typically a read only memory, or ROM) and primary storage devices 1036 (typically a random access memory, or RAM).

Computer system 1030 or, more specifically, CPUs 1032, may be arranged to support a virtual machine, as will be appreciated by those skilled in the art. One example of a virtual machine that is supported on computer system 1030 will be described below with reference to FIG. 13. As is well known in the art, ROM acts to transfer data and instructions uni-directionally to the CPUs 1032, while RAM is used typically to transfer data and instructions in a bi-directional manner. CPUs 1032 may generally include any number of processors. Both primary storage devices 1034, 1036 may include any suitable computer-readable media. A secondary storage medium 1038, which is typically a mass memory device, is also coupled bi-directionally to CPUs 1032 and provides additional data storage capacity. The mass memory device 1038 is a computer-readable medium that may be used to store programs including computer code, data, and the like. Typically, mass memory device 1038 is a storage medium such as a hard disk or a tape which generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPUs 1032.

CPUs 1032 are also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPUs 1032 optionally may be coupled to a computer or telecommunications network, e.g., an internet network or an intranet network, using a network connection as shown generally at 1012. With such a network connection, it is contemplated that the CPUs 1032 might receive information from the network, or might output information to the network in the course of performing the above-described method steps. Such information, which is often represented as a sequence of instructions to be executed using CPUs 1032, may be received from and outputted to the network, for example, in the form of a computer data signal embodied in a carrier wave. The above-described devices and materials will be familiar to those of skill in the computer hardware and software arts.

Figure 13:
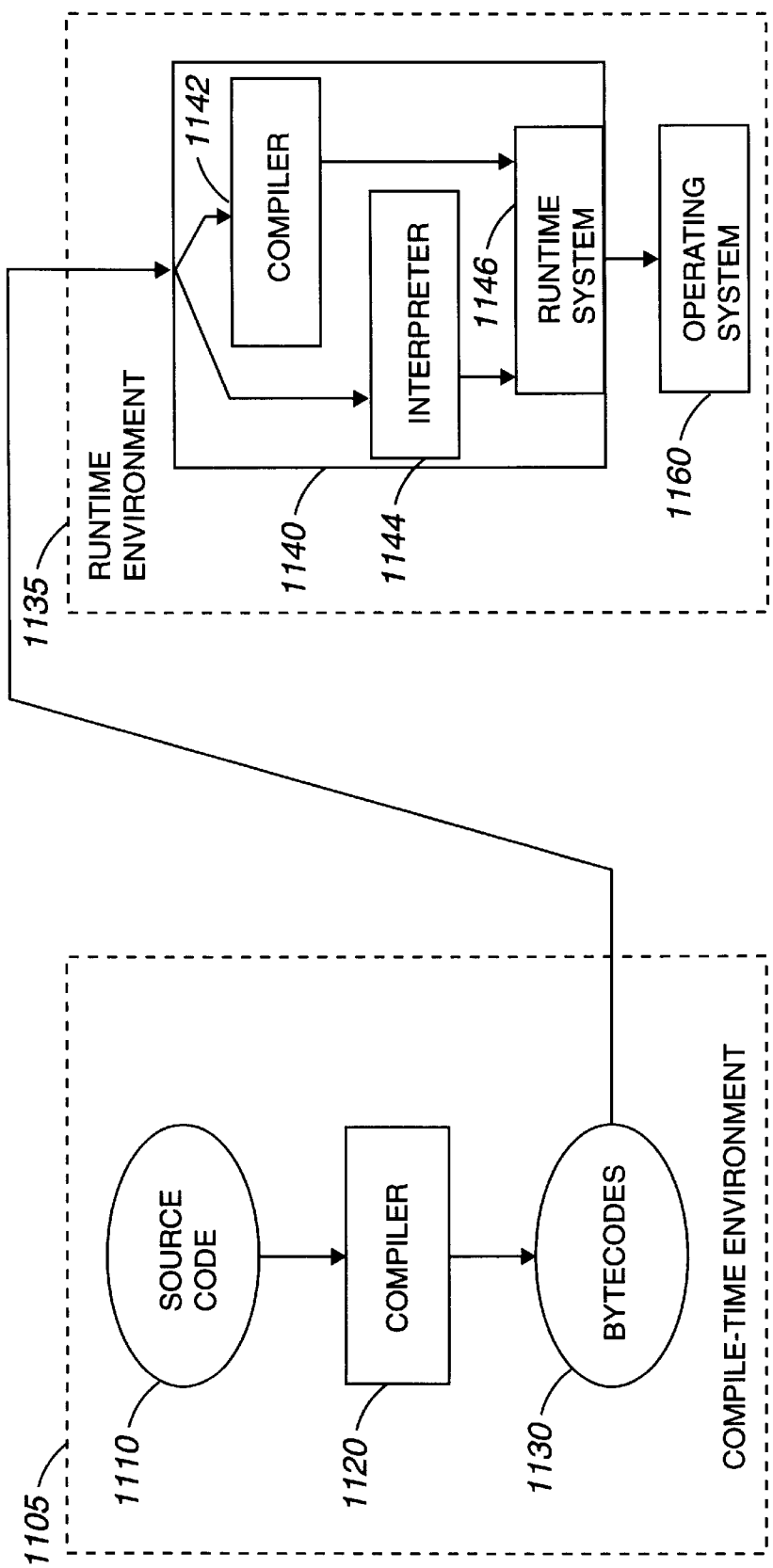
FIG. 13 is a diagrammatic representation of a virtual machine suitable for implementing the present invention.

As previously mentioned, a virtual machine may execute on computer system 1030. FIG. 13 is a diagrammatic representation of a virtual machine which is supported by computer system 1030 of FIG. 12, and is suitable for implementing the present invention. When a computer program, e.g., a computer program written in the Java™ programming language, is executed, source code 1110 is provided to a compiler 1120 within compile-time environment 1105. Compiler 1120 translates source code 1110 into bytecodes 1130. In general, source code 1110 is translated into bytecodes 1130 at the time source code 1110 is created by a software developer.

Bytecodes 1130 may generally be reproduced, downloaded, or otherwise distributed through a network, e.g., network 1012 of FIG. 12, or stored on a storage device such as primary storage 1034 of FIG. 12. In the described embodiment, bytecodes 1 130 are platform independent. That is, bytecodes 1130 may be executed on substantially any computer system that is running on a suitable virtual machine 1140.

Bytecodes 1130 are provided to a runtime environment 1135 which includes virtual machine 1140. Runtime environment 1135 may generally be executed using a processor or processors such as CPUs 1032 of FIG. 12. Virtual machine 1140 includes a compiler 1142, an interpreter 1144, and a runtime system 1146. Bytecodes 1130 may be provided either to compiler 1142 or interpreter 1144.

When bytecodes 1130 are provided to compiler 1142, methods contained in bytecodes 1130 are compiled into machine instructions. In one embodiment, compiler 1142 is a just-in-time compiler which delays the compilation of methods contained in bytecodes 1130 until the methods are about to be executed. When bytecodes 1130 are provided to interpreter 1144, bytecodes 1130 are read into interpreter 1144 one bytecode at a time. Interpreter 1144 then performs the operation defined by each bytecode as each bytecode is read into interpreter 1144. That is, interpreter 1144 "interprets" bytecodes 1130, as will be appreciated by those skilled in the art. In general, interpreter 1144 processes bytecodes 1130 and performs operations associated with bytecodes 1130 substantially continuously.

When a method is invoked by another method, or is invoked from runtime environment 1135, if the method is interpreted, runtime system 1146 may obtain the method from runtime environment 1135 in the form of a sequence of bytecodes 1130, which may be directly executed by interpreter 1144. If, on the other hand, the method which is invoked is a compiled method which has not been compiled, runtime system 1146 also obtains the method from runtime environment 1135 in the form of a sequence of bytecodes 1130, then may go on to activate compiler 1142. Compiler 1142 then generates machine instructions from bytecodes 1130, and the resulting machinelanguage instructions may be executed directly by CPUs 1032. In general, the machine-language instructions are discarded when virtual machine 1140 terminates. The operation of virtual machines or, more particularly, Java™ virtual machines, is described in more detail in *The Java™ Virtual Machine Specification* by Tim Lindholm and Frank Yellin (ISBN 0-201-63452-X), which is incorporated herein by reference.

Although only a few embodiments of the present invention have been described, it should be understood that the present invention may be embodied in many other specific forms without departing from the spirit or the scope of the present invention. By way of example, steps involved with locking an object and unlocking an object may be reordered. Steps may also be removed or added without departing from the spirit or the scope of the present invention.

While the process of unboosting a boosted thread has been described as being initiated by a thread which boosted the boosted thread, in one embodiment, the boosted thread may unboost itself. In other words, a boosted thread may at least initiate the process of unboosting itself to its assigned priority. Alternatively, some boosted threads may be unboosted by their associated boosting threads, while other boosted threads may unboost themselves.

Although the methods of locking and unlocking objects in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

Status indicators have been described as being bits which identify whether an object is locked, unlocked, or busy. Although the number of bits associated with a status indicator has been described as being either a single bit or two bits, the number of bits associated with a status indicator may generally be widely varied. In addition, it should be appreciated that the status of an object may be identified using mechanisms other than a status indicator. By way of example, the object may include a pointer to a list which identifies the status of the object.

While the present invention has been described as being used with a computer system which has an associated virtual machine, it should be appreciated that the present invention may generally be implemented on any suitable object-oriented computer system. Specifically, the methods of locking an unlocking an object in accordance with the present invention may generally be implemented in any multithreaded, object-oriented system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A computer-implemented method for obtaining a header value of an object using a first thread, the object including an object header, the first thread having an associated execution stack and having a first thread execution priority, the method comprising:

a) replacing contents of the object header with a sentinel which identifies the stack;

b) determining whether the contents include a header value of the object; and c) when it is determined that the contents do not include the header value of the object, determining when the object is being studied by a second thread.

2. A computer-implemented method as recited in claim 1 wherein when it is determined that the object is not in the process of being studied by the second thread, the method further includes:

adding the first thread to a list associated with the stack, the list being arranged to indicate that the first thread is awaiting access to the object; and returning the contents to the object header.

3. A computer-implemented method as recited in claim 1 further including:

receiving a notification for the first thread to access the object; and repeating steps a)–c).

4. A computer-implemented method as recited in claim 1 wherein when it is determined that the object is in the process of being studied by the second thread, the method further includes:

resolving the contents to identify the second thread;

determining whether a second thread execution priority associated with the second thread is less than the first thread execution priority.

5. A computer-implemented method as recited in claim 4 wherein when it is determined that the second thread execution priority is less than the first thread execution priority, the method further includes boosting the second thread execution priority to the first thread execution priority.

6. A computer-implemented method as recited in claim 5 further including:

incrementing a counter associated with the second thread to indicate that the second thread execution priority has been boosted;

adding the second thread and the counter to a queue of boosted threads, the queue of boosted threads being associated with the first thread; and repeating steps a)–c).

7. A computer-implemented method as recited in claim 1 wherein when it is determined that the contents include the header value, the method further includes:

storing the contents on the stack in a particular location; and storing a pointer in the object header, wherein the pointer is arranged to identify the particular location.

8. A computer-implemented method as recited in claim 7 further including unboosting a second thread execution priority of the second thread, wherein the second thread execution priority was boosted to the first thread execution priority.

9. A computer-implemented method as recited in claim 8 wherein unboosting the second thread execution priority of the second thread involves unboosting the second thread execution priority to an assigned execution priority of the second thread.

10. A computer-implemented method as recited in claim 1 further including constructing the sentinel.

11. A computer-implemented method for returning a header value of an object to the object, the header value being stored on an execution stack associated with a first thread, the object including an object header, the first thread having a first thread execution priority, the method comprising:

a) exchanging contents of the object header for a sentinel arranged to identify the execution stack; and
   b) using the contents to determine if the object is being studied by a second thread; and
   c) when it is determined that the object is not being studied by the second thread, replacing the sentinel with the header value.

12. A computer-implemented method as recited in claim 11 wherein when it is determined that the object is being studied by the second thread, the method further includes:

resolving the contents to identify the second thread;
   determining whether a second thread execution priority associated with the second thread is less than the first thread execution priority.

13. A computer-implemented method as recited in claim 12 wherein when it is determined that the second thread execution priority is less than the first thread execution priority, the method further includes boosting the second thread execution priority to the first thread execution priority.

14. A computer-implemented method as recited in claim 13 further including:

incrementing a counter associated with the second thread to indicate that the second thread execution priority has been boosted;
   adding the second thread and the counter to a queue of boosted threads, the queue of boosted threads being associated with the first thread; and
   repeating steps a)–c).

15. A computer program product for associating an object with a first thread, the object including an object header, the first thread having an associated stack allocated in a memory associated with a computer system, the computer program product comprising:

computer code that obtains contents of the object header; and
   computer code that stores the contents of the object header at a first location within the stack;
   computer code that stores a reference indicator in the object header, the reference indicator being arranged to identify the stack;
   computer code that determines when the contents of the object header do not include a header value;
   computer code that determines when the object is in the process of being studied by a second thread when the contents of the object header do not include the header value; and
   a computer readable medium that stores the computer codes.

16. A computer program product according to claim 15 wherein the computer readable medium is a data signal embodied in a carrier wave.

17. A computer program product according to claim 15 further including computer code that updates a status indicator associated with the object to indicate that the reference indicator is stored in the object header.

18. A computer program product according to claim 17 wherein the contents of the object header are the header value, and the computer code that updates the status indicator includes computer code that updates the status indicator to indicate that the object is accessible to the first thread.

19. A computer program product according to claim 15 wherein the reference is a sentinel, the computer program product further including:

computer code that stores a forwarding pointer in the object header when it is determined that the contents of the object header are the header value, the forwarding pointer being arranged to identify the first location within the stack.

20. A computer program product according to claim 19 further including:

computer code that returns the contents of the object header to the object header when it is determined that the contents of the object header are not the header value; and
   computer code that updates a status indicator associated with the object to indicate that the contents of the object header are in the object header when it is determined that the contents of the object header are not the header value.

21. A computer program product according to claim 19 further including computer code that determines whether the contents of the object header identify a second location within the stack when it is determined that the contents of the object header are not a header value.

22. A computer program product according to claim 21 further including:

computer code that returns the contents of the object header to the object header when the contents of the object header identify a second location within the stack; and
   computer code that stores an indicator value in the first location within the stack when the contents of the object header identify a second location within the stack, the indicator value being arranged to indicate that the header value is stored in the second location within the stack.

23. A computer system including a memory which includes a plurality of threads, each of the plurality of threads having an associated stack, the computer system comprising:

a processor coupled to the memory; and
   an object including an object header, the object header being arranged to contain a header value which includes information relating to the object, wherein a first thread selected from the plurality of threads is arranged to obtain the header value and to place a first reference indicator in the object header, the first reference indicator being arranged to identify the stack associated with the first thread; and
   a second thread selected from the plurality of threads, the second thread being arranged to obtain the reference indicator from the object header and to use the reference indicator to determine that the object is not available to the second thread.

24. A computer system as recited in claim 23 wherein the object includes a status indicator that is arranged to indicate that the first reference indicator is stored in the object header.

25. A computer system as recited in claim 23 wherein the stack associated with the first thread is arranged to store the header value in a first location, wherein the first reference indicator is arranged to identify the first location.

26. A computer system as recited in claim 23 wherein the second thread is arranged to place a second reference indicator in the object header, the second reference indicator being arranged to identify the stack associated with the second thread, the computer system further including a third thread selected from the plurality of threads which is arranged to obtain the second reference indicator from the object header, the third thread further being arranged to place a third reference indicator in the object header, the third reference indicator being arranged to identify the stack associated with the third thread.

* * * * *